(12) United States Patent
Sato

(10) Patent No.: US 11,914,139 B2
(45) Date of Patent: Feb. 27, 2024

(54) SCANNING OPTICAL APPARATUS AND IMAGE FORMING APPARATUS

(71) Applicant: CANON KABUSHIKI KAISHA, Tokyo (JP)

(72) Inventor: Wataru Sato, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 364 days.

(21) Appl. No.: 17/314,934

(22) Filed: May 7, 2021

(65) Prior Publication Data
US 2021/0364785 A1    Nov. 25, 2021

(30) Foreign Application Priority Data
May 25, 2020   (JP) .................. 2020-090487

(51) Int. Cl.
*G02B 26/12*   (2006.01)
*G02B 26/10*   (2006.01)

(52) U.S. Cl.
CPC ......... *G02B 26/122* (2013.01); *G02B 26/105* (2013.01); *G02B 26/125* (2013.01)

(58) Field of Classification Search
CPC .. G02B 26/122; G02B 26/105; G02B 26/125; G02B 26/124; G02B 26/123; G02B 26/10; G02B 26/12; G06K 15/1228; B41J 2/47; G03G 15/04; H04N 1/113; H04N 2201/02416

USPC ...................................... 359/216.1
See application file for complete search history.

(56) References Cited

U.S. PATENT DOCUMENTS

| | | | |
|---|---|---|---|
| 9,405,117 B2 | 8/2016 | Murotani et al. | H04N 1/02481 |
| 10,914,940 B2 | 2/2021 | Sano | G02B 26/124 |
| 2002/0075916 A1 | 6/2002 | Sato et al. | 372/36 |
| 2014/0168737 A1* | 6/2014 | Murotani | H04N 1/113 359/204.1 |
| 2019/0094530 A1 | 3/2019 | Sano | G02B 26/122 |

FOREIGN PATENT DOCUMENTS

| | | |
|---|---|---|
| JP | 2014-098767 | 5/2014 |
| JP | 2014-134781 | 7/2014 |
| JP | 2019-061192 | 4/2019 |

* cited by examiner

*Primary Examiner* — Wyatt A Stoffa
*Assistant Examiner* — Mitchell T Oestreich
(74) *Attorney, Agent, or Firm* — Venable LLP

(57) ABSTRACT

A scanning optical apparatus includes a first light source unit, a second light source unit, a rotary polygon mirror and a casing provided with a bottom surface on which said deflection unit is disposed. The second light source unit is disposed at a position away from the bottom surface more than the first light source unit with respect to a rotational axis direction of the rotary polygon mirror. The casing is provided with first and second supporting surfaces for supporting the first and second light source. Both the first and second supporting surfaces are faced in a direction away from the bottom surface.

17 Claims, 13 Drawing Sheets

(a)

(b)

SCANNING OPTICAL APPARATUS AND IMAGE FORMING APPARATUS

FIELD OF THE INVENTION AND RELATED ART

The present invention relates to a scanning optical apparatus, in particular, a scanning optical apparatus which is employed by an electrophotographic image forming apparatus such as a laser printer and a digital copying machine, to scan the peripheral surface of a photosensitive member of the image forming apparatus with a beam of laser light to expose the peripheral surface of a photosensitive member. It is also related to an image forming apparatus.

There have been available such color image forming apparatuses that have multiple photosensitive members aligned in tandem, and form a color image by forming electrostatic latent images on the photosensitive members, one for one, developing the electrostatic latent images into visible images with the use of cyan, yellow, magenta and black toners, one for one, and placing the four toner images in layers. Regarding a scanning optical apparatus with which a color image forming apparatus such as the one described above is provided, there is proposed in Japanese Laid-open Patent Application No. 2014-134781, a method for supporting light source units, which are positioned next to each other in terms of the secondary scan direction, by the casing of the scanning optical apparatus, with the use of a holder. In the case of this method, the casing of the scanning optical apparatus is provided with a wall which keeps the light source units on the top side of the wall separated from the light source units which are on the bottom side of the wall. Further, the top side of the wall is provided with supporting portions which are V-shaped in cross-section, having therefore a pair of upwardly facing slanted supporting surfaces. The bottom side of the wall is provided with supporting portions which also are V-shaped in cross section, having therefore a pair of downwardly facing slant supporting surfaces. The light source units which are on the top side of the wall are fixed to the upwardly facing supporting surface of the supporting portion of the wall, and the light source units which are on the bottom side of the wall are fixed to the downwardly facing supporting surfaces of the supporting portions of the wall.

However, conventional methods such as the one described above suffer from an issue which will be described next. In the case of a conventional method, the top and bottom light source unit supporting surfaces of the supporting portion of the casing are on the opposite sides of the aforementioned supporting wall. Thus, in a case where the casing is molded of resin, the mold for the top light source unit supporting surface is different from the mold for the bottom light source supporting surface, making it more difficult to provide a scanning optical apparatus which is accurate in the properties of the supporting surfaces, and the positional relationship among the supporting surface.

SUMMARY OF THE INVENTION

The present invention was made in consideration of the issue described above. Thus, the primary object of the present invention is to provide a method for substantially improving a scanning optical apparatus in the accuracy of the position of each of its multiple light source units, to prevent a scanning optical apparatus from reducing in its optical performance during its operation.

According to an aspect of the present invention, there is provided a scanning optical apparatus comprising: a first light source unit provided with a first light source and a cylindrical first holding member for holding said first light source; a second light source unit provided with a second light source and a cylindrical second holding member for holding said second light source; a deflection unit provided with a rotary polygon mirror for deflecting laser beams emitted from said first light source and said second light source; and a casing provided with a bottom surface on which said deflection unit is disposed, wherein said second light source unit is disposed at a position away from the bottom surface more than said first light source unit with respect to a rotational axis direction of said rotary polygon mirror, wherein said casing is provided with a first supporting surface for supporting said first light source and a second supporting surface for supporting said second light source, and wherein both the first supporting surface for supporting said first light source and the second supporting surface for supporting said second light source are faced in a direction away from the bottom surface.

Further features of the present invention will become apparent from the following description of exemplary embodiments (with reference to the attached drawings).

Figure 5:
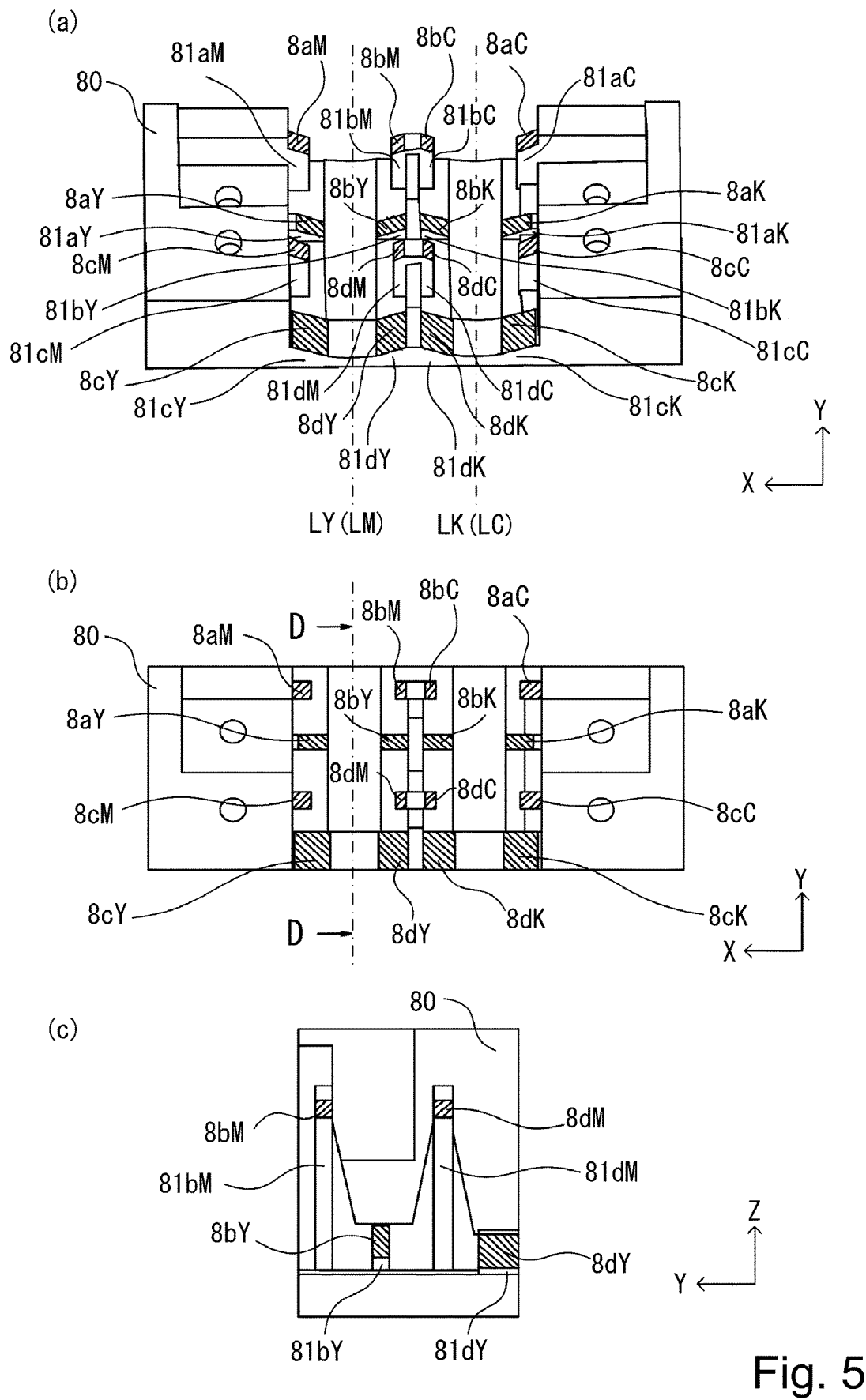

Parts (a), (b) and (c) of FIG. 5 are external, top, and sectional (at plane D-D) views, respectively, of the essential portion of the light source unit supporting portions of the casing of the scanning optical apparatus in the preferred embodiment.

Figure 6:
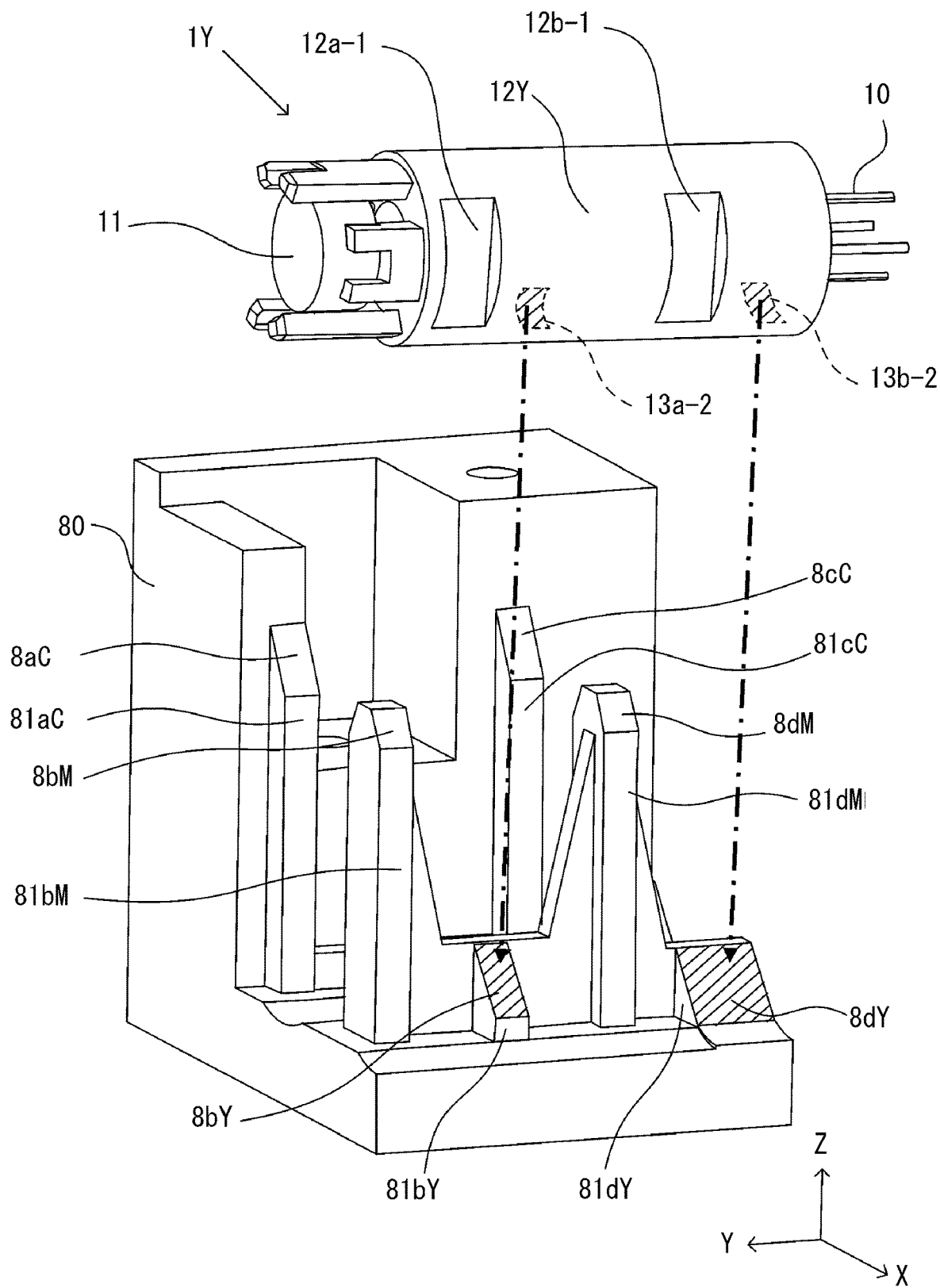

FIG. 6 is a combination of an external perspective view of one of the light source units, and an external perspective view of the essential portions of the casing of the scanning optical apparatus in the preferred embodiment; it shows how one of the light source units on the bottom side is attached to the casing.

Figure 7:
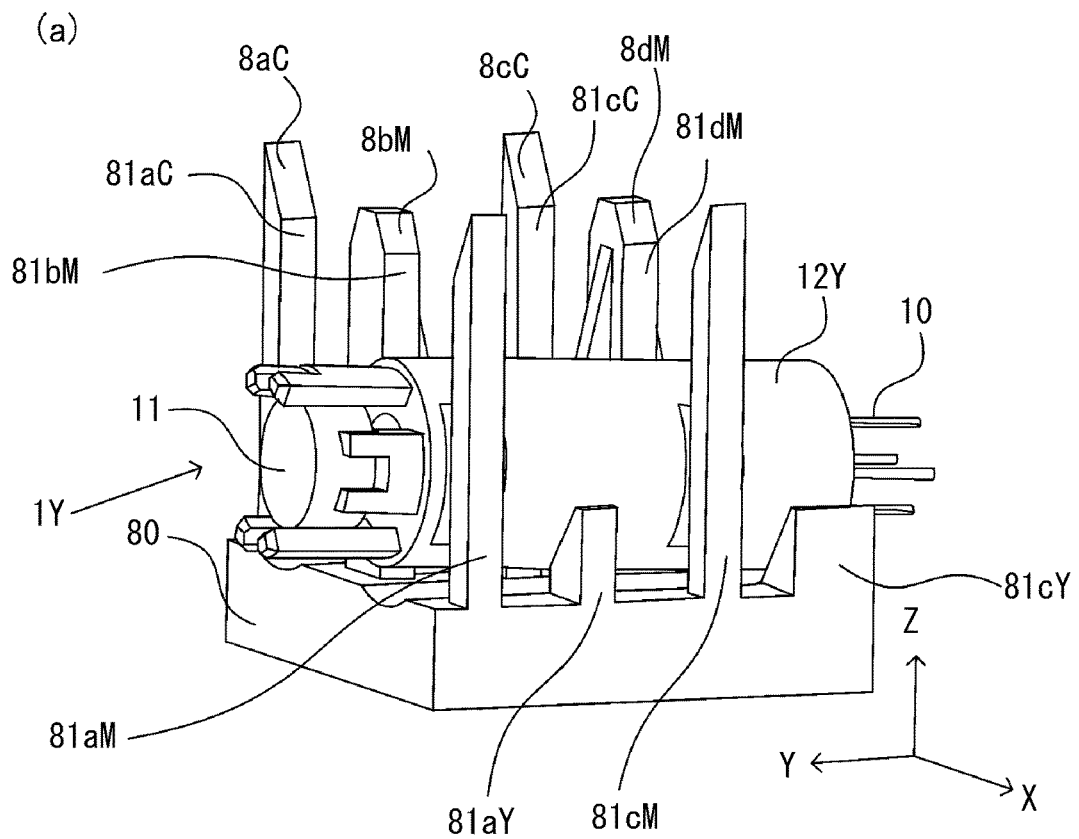
Figure 7:
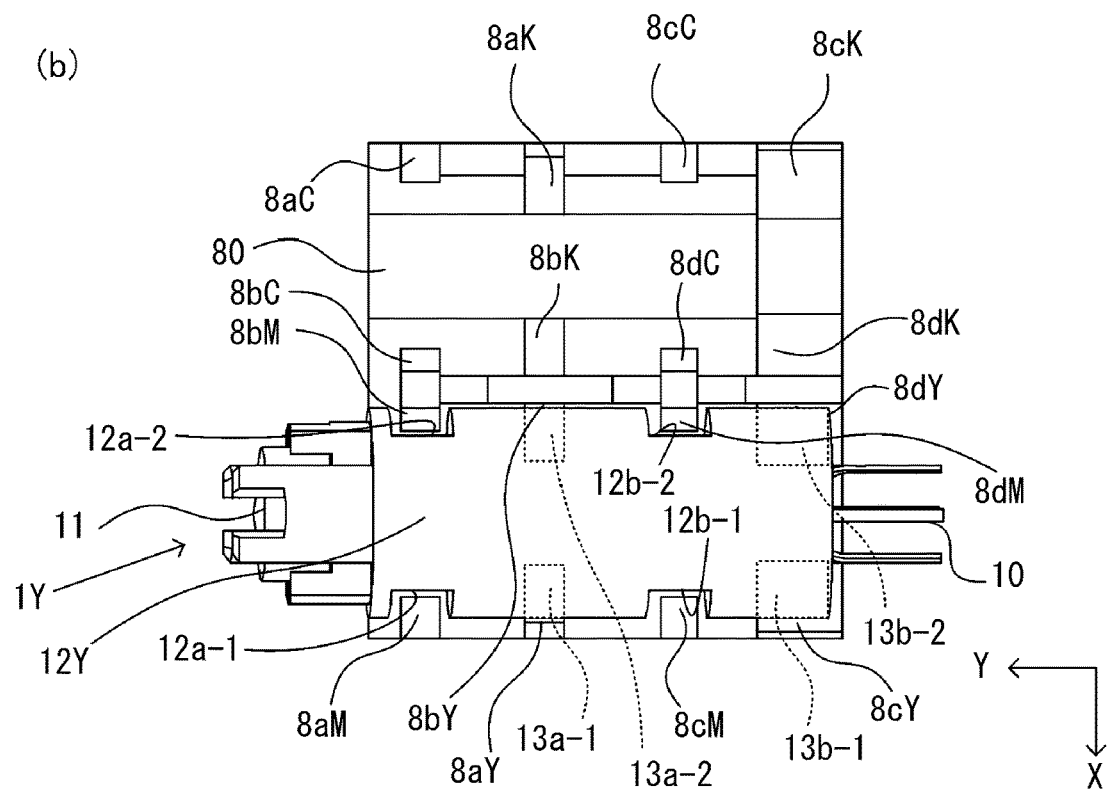

Part (a) of FIG. 7 is a perspective view of a combination of one of the bottom light source units, and the casing of the scanning optical apparatus, and part (b) of FIG. 7 is an external top view of the combination of the bottom light source unit and the casing of the light source unit, in part (a) of FIG. 7; it shows how the bottom light source unit is attached to the casing.

Figure 8:
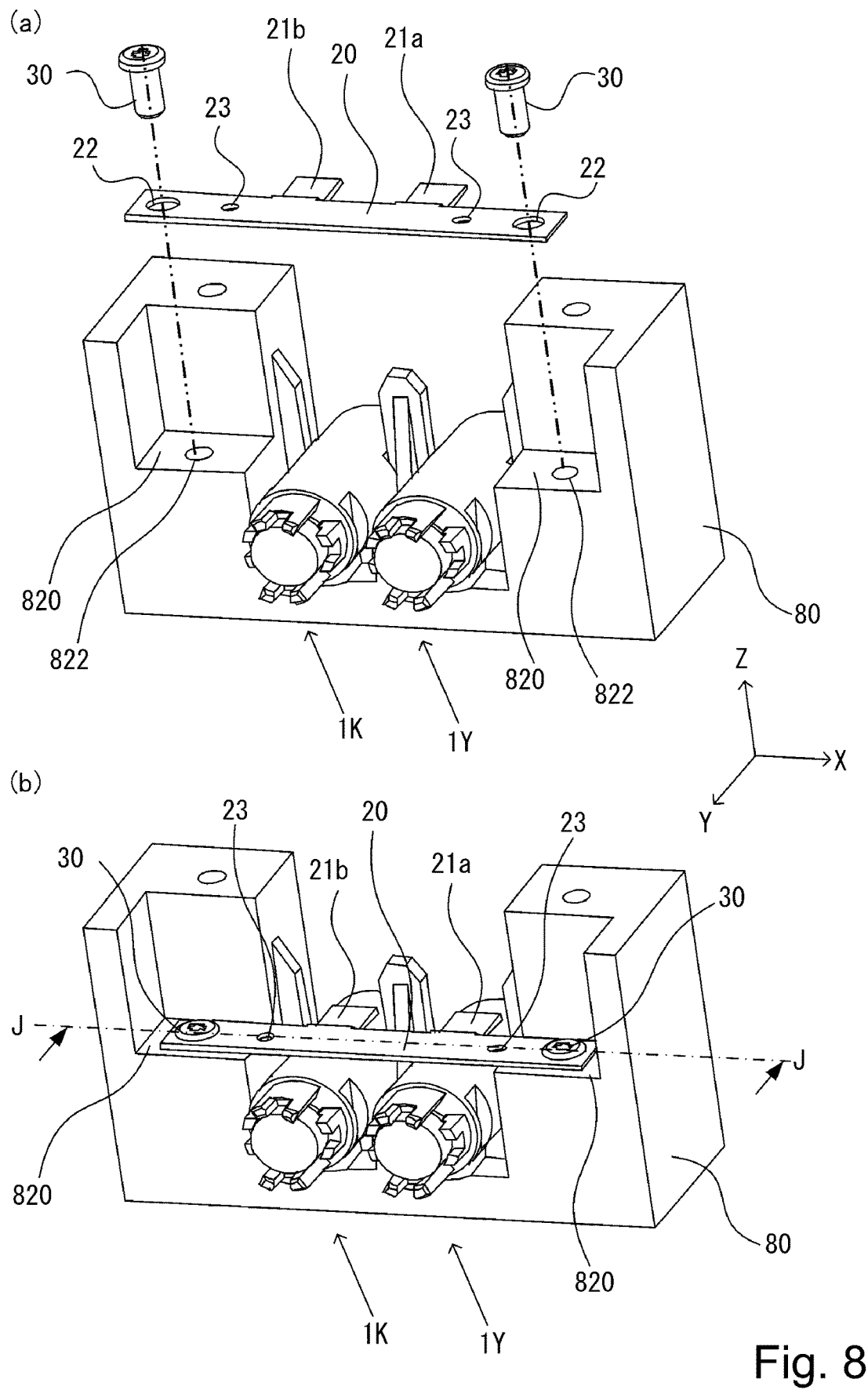

Parts (a) and (b) of FIG. 8 are perspective views of a combination of the casing, pair of light source units, fixation spring, etc., before and after, respectively, the attachment of the fixation spring to the casing; they show how the bottom light source units are attached to the casing, units, casing, fixation spring 20, etc., after the assembly of these components.

Figure 9:
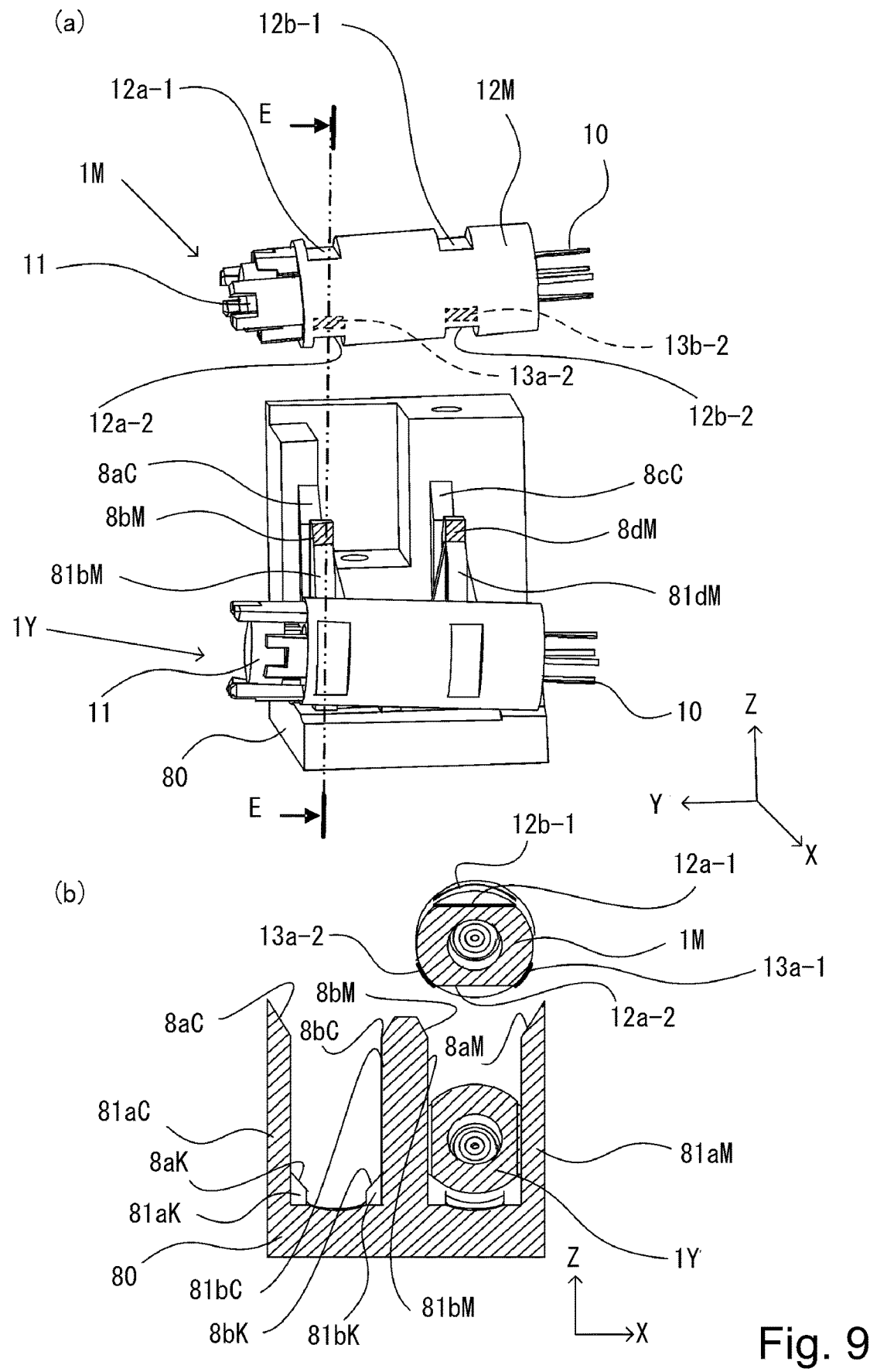

Part (a) of FIG. 9 is perspective view of a combination of one of the bottom light source units, one of the bottom light source unit, casing, etc., and part (b) of FIG. 9 is a sectional view of the same combination, at a plane E-E in part (a) of FIG. 9; they show how the tope light source unit is attached to the casing.

Figure 10:
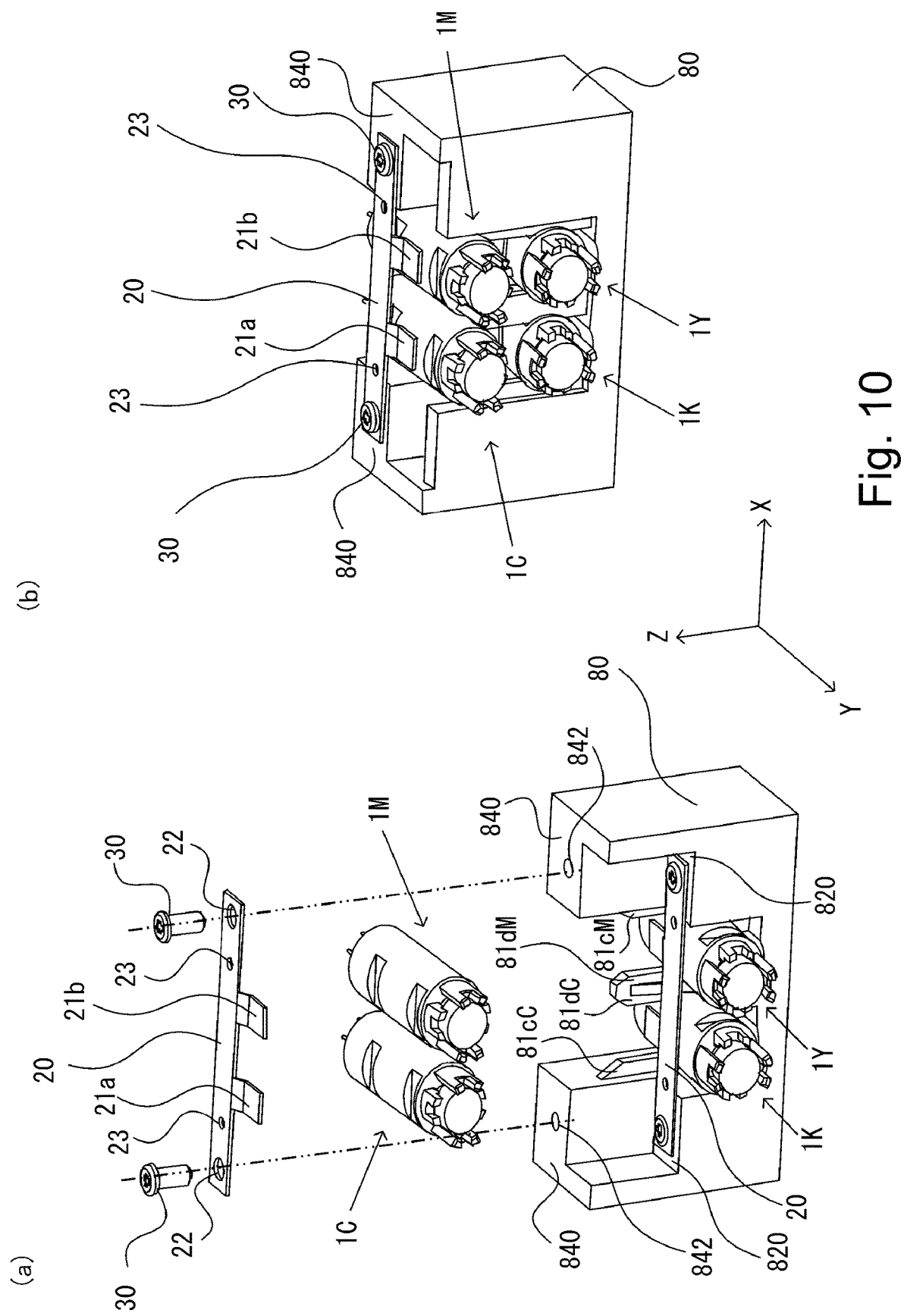

Part (a) of FIG. 10 is an exploded perspective view of a combination of the light source units, fixation springs, casing, etc., and part (b) of FIG. 10 is a perspective view of an assembled combination of the same; they show how the light source units are attached to the casing.

Figure 11:
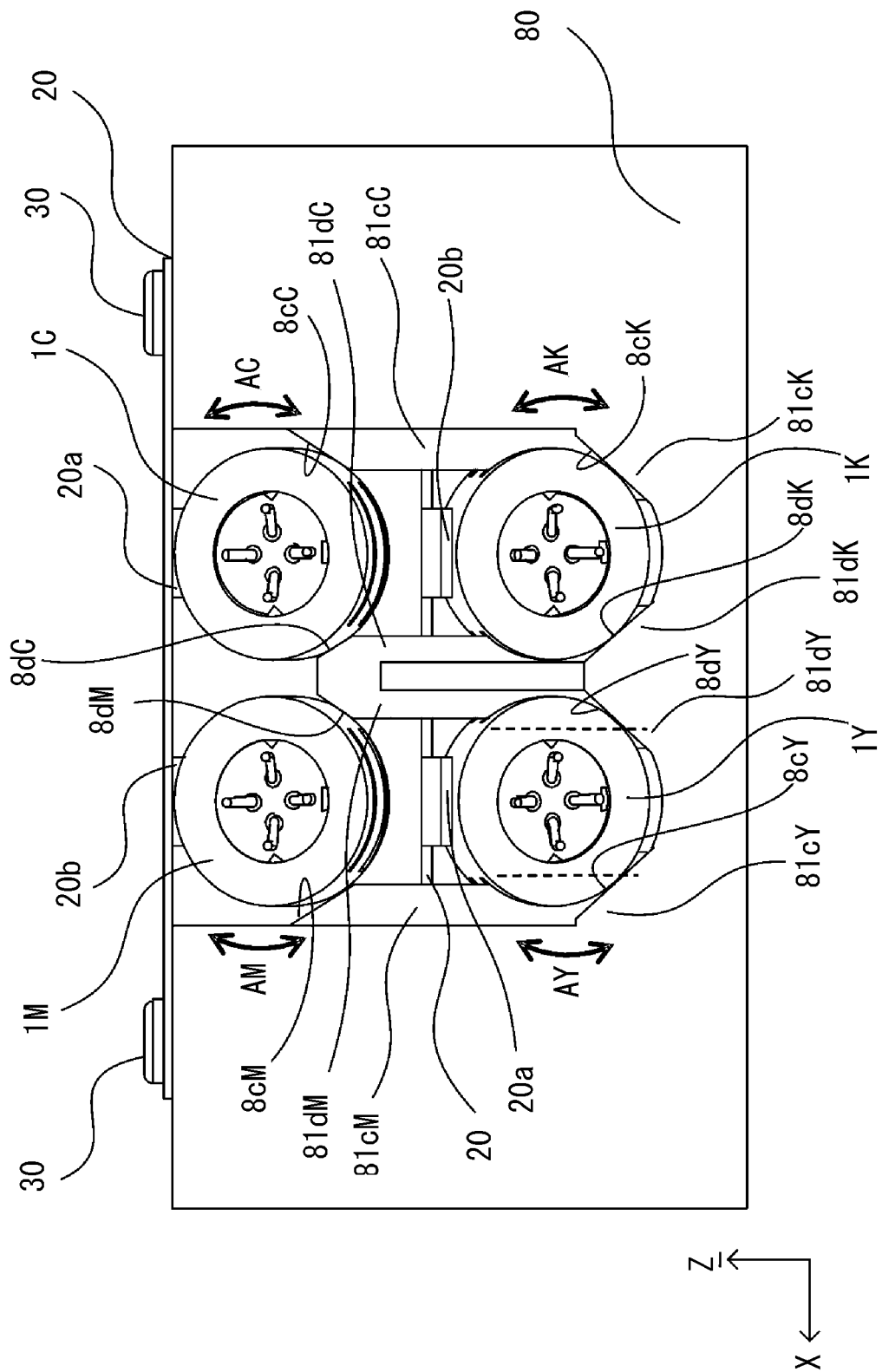

FIG. 11 is an external view of the light source unit 1 in the preferred embodiment; it is for showing how the light source units are adjusted in rotational phase.

Figure 12:
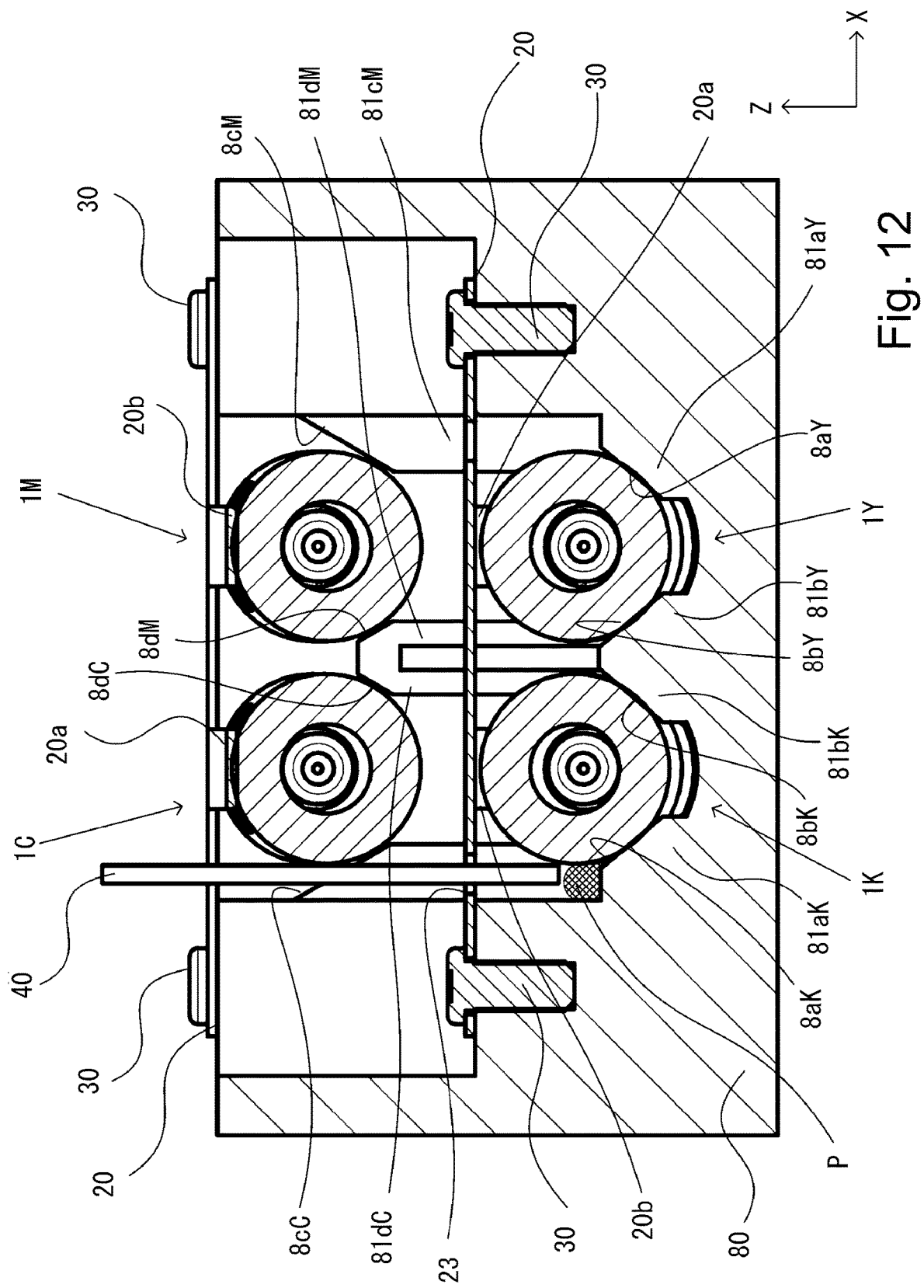

FIG. 12 is a sectional view of the essential portion of the light source unit; it is for showing how the light source units are glued to the casing.

Figure 13:
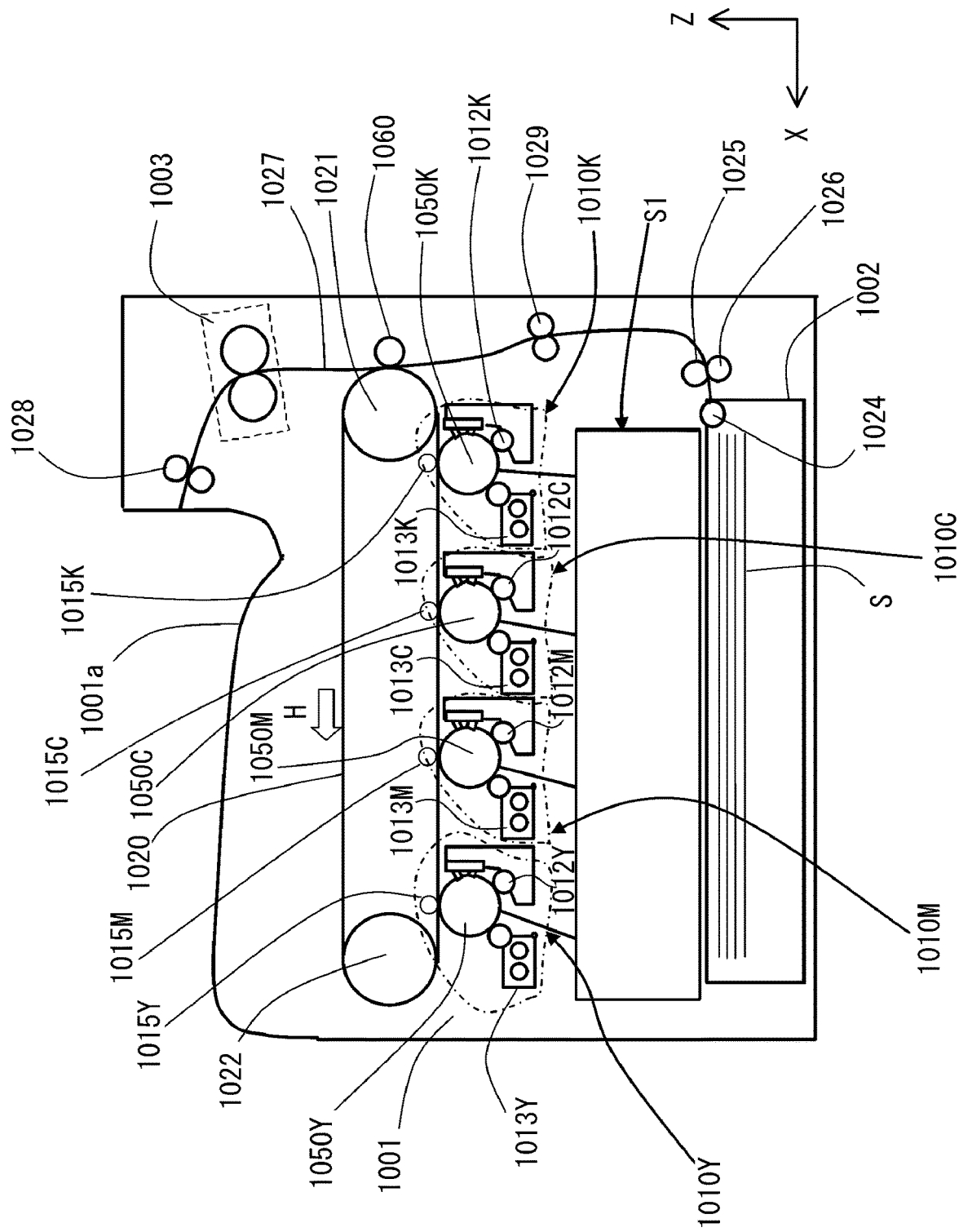

FIG. 13 is a schematic sectional view of a typical image forming apparatus which is compatible with the scanning optical apparatus in the preferred embodiment.

DESCRIPTION OF THE EMBODIMENTS

Hereafter, the present invention is described with reference to the scanning optical apparatus in one of the preferred embodiments of the present invention, and appended drawings. However, the measurements, materials, shapes of the structural components of the scanning optical apparatus in this embodiment, and their positional relationship are not intended to limit the present invention in scope. That is, the present invention is to be altered as necessary, according to the structure of an apparatus to which the present invention is applied, and various conditions under which apparatuses are used.

<Embodiment>

First, one of the scanning optical apparatuses which are in accordance with the present invention is described. Then, its light source unit is described in detail. Here, the direction (which may be referred to as secondary scan direction) which is parallel to the rotational axis of the rotational polygonal mirror, which will be described later, is referred to as axis Z direction. The direction (which also is parallel to lengthwise direction of optical members) in which a beam of laser light is projected toward the rotational polygonal mirror is referred to as axis Y direction. Further, the direction which is perpendicular to both the axis Z direction and axis Y direction is referred to as axis X direction. Moreover, the gravity direction, which will be mentioned in the following portion of this application is the opposite (minus) direction from the axis Z direction indicated by an arrow mark.

[Scanning Optical Apparatus S1]

Figure 1:
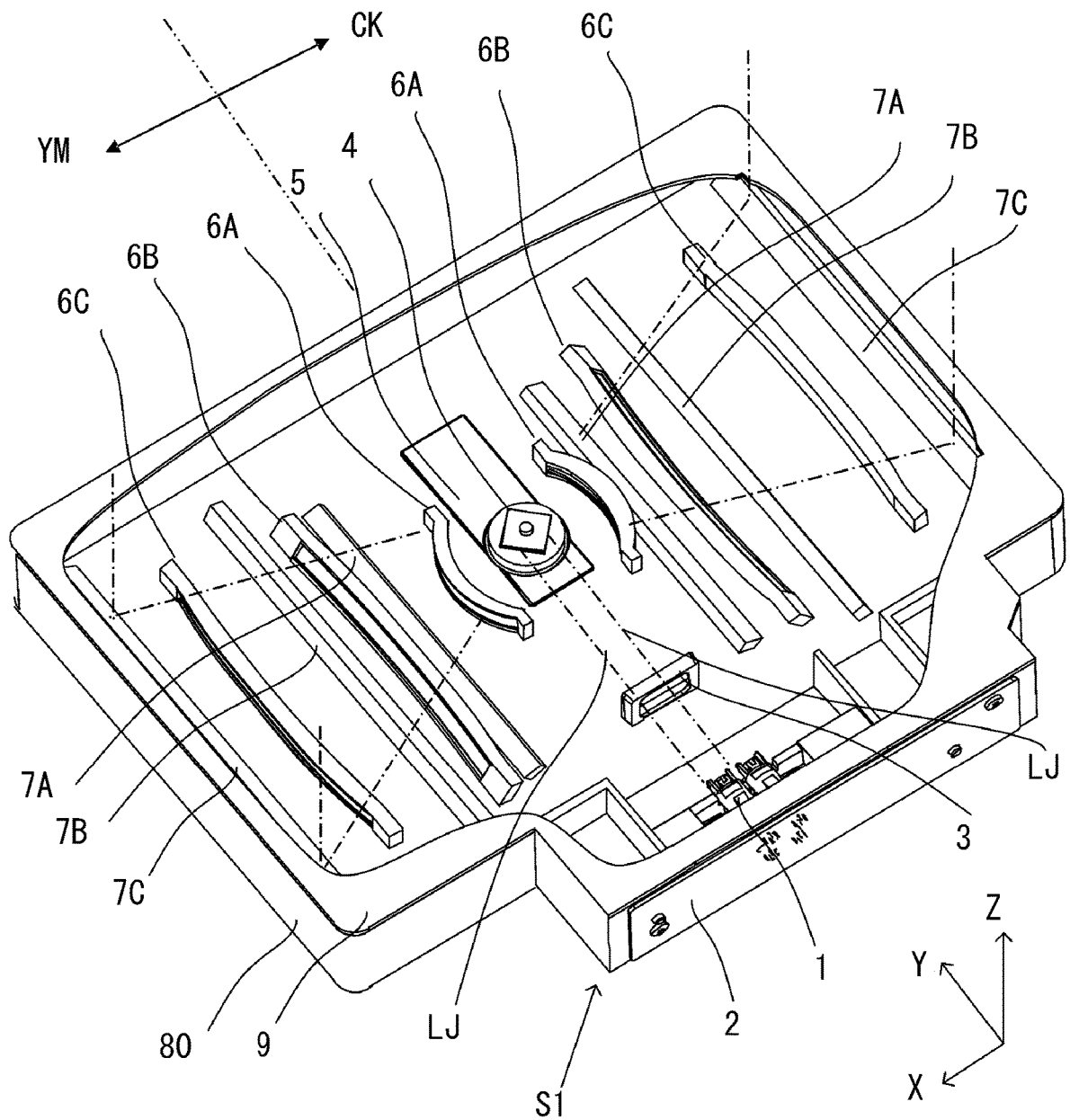
FIG. 1 is a schematic perspective view of the scanning optical apparatus in one of the preferred embodiments of the present invention; it shows the internal structure of the apparatus.

FIG. 1 is a schematic perspective view of a typical embodiment of scanning optical apparatus which is in accordance with the present invention. It is for describing the internal structure of the apparatus S1. The scanning optical apparatus S1 is mounted in an image forming apparatus (FIG. 13) for forming a color image. It is related to the exposure of each of the four photosensitive members for cyan (C), yellow (Y), magenta (M) and black (K) colors, one for one. The scanning optical apparatus S1 has a light source unit 1, a circuit board 2 for driving the light source unit 1, a cylindrical lens 3, a rotational polygonal mirror 4, and a deflection unit 5 which supports the rotational polygonal mirror 4. The deflection unit 5 is placed on the bottom wall of the casing 80. Further, the scanning optical apparatus S1 has lenses 6A, 6B and 6C, deflection mirrors 7A, 7B and 7C, and the casing 80 formed of resin, and a lid 9. By the way, single dot chain lines LJ indicate the path of the beam of laser light projected from the light source unit 1. Here, the cylindrical lens 3, deflection unit 5, lenses 6A, 6B and 6C, deflection mirrors 7A, 7B and 7C are fixed to the casing 80 with the use of known technologies such as gluing, holding by elastic members, biding with the use of screws, etc. After the attachment of the aforementioned various optical components to the interior of the casing 80, the lid 9 is attached to the casing 80 to enclose the interior of the casing 80. The attachment of the lid 9 to the casing 80 completes the scanning optical apparatus S1. By the way, in order to show the components in the casing 80, a part of the lid 9 is not shown in FIG. 1.

Next, the scanning optical apparatus S1 is described about its working. It has four light source units 1, which correspond to four primary colors of a multicolor image. As a beam LJ of laser light is projected from the light source unit 1, it passes through the cylindrical lens 3. Then, it is focused on one of the reflective surfaces of the rotational polygonal mirror 4. By the way, the rotational polygonal mirror 4 has four reflective surfaces, for example. It is rotationally driven at a high speed by the motor which the deflection unit 5 has. As the beam LJ of laser light enters the deflection unit 5, it is deflected by the one of the reflective surfaces of the rotational polygonal mirror 4. Two of the four beams LJ of laser light projected from the four light source units 1 are deflected toward the first scanning optical system YM by the deflection unit 5. Other two beams LJ of laser light are deflected toward the second scanning optical systems CK.

The first scanning optical system YM has two (first and second) light passages. The first light passage is the passage for one of the two beams LJ deflected by the rotational polygonal mirror 4. It passes through the lens 6A, is reflected by a mirror 7, passes through the lens 6B, and is focused on the peripheral surface of the photosensitive drum 1050M (FIG. 13), and scans the peripheral surface of the photosensitive drum 1050M, forming thereby an electrostatic latent image on the peripheral surface of the photosensitive drum 1050M. The second light passage is the light passages of the other of the two beams LJ of laser light reflected by the rotational polygonal mirror 4. It passes through the lenses 6A and 6C, is reflected by a mirror 7C, and is focused on the peripheral surface of the photosensitive drum 1050Y (FIG. 13), and scans the peripheral surface of the photosensitive drum 1050Y, forming thereby an electrostatic latent image on the peripheral surface of the photosensitive drum 1050Y. The second scanning optical system CK is on the opposite side of the deflection unit 5 from the first scanning optical system YM. Regarding the light passages, the second scanning optical system CK is similar in structure to the first scanning optical system YM. Therefore, it is not described.

[Light Source Units]

Figure 2:
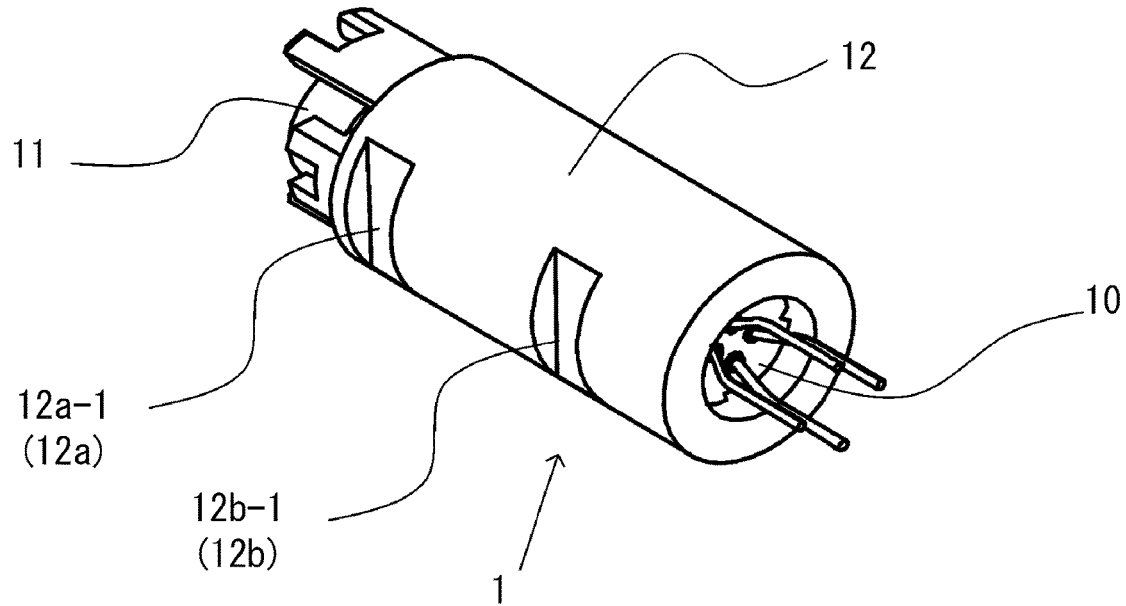
FIG. 2, parts (a) and (b), is a combination of a perspective view of the light source unit in the first embodiment, and a partially sectional perspective view of the light source unit.
Figure 2:
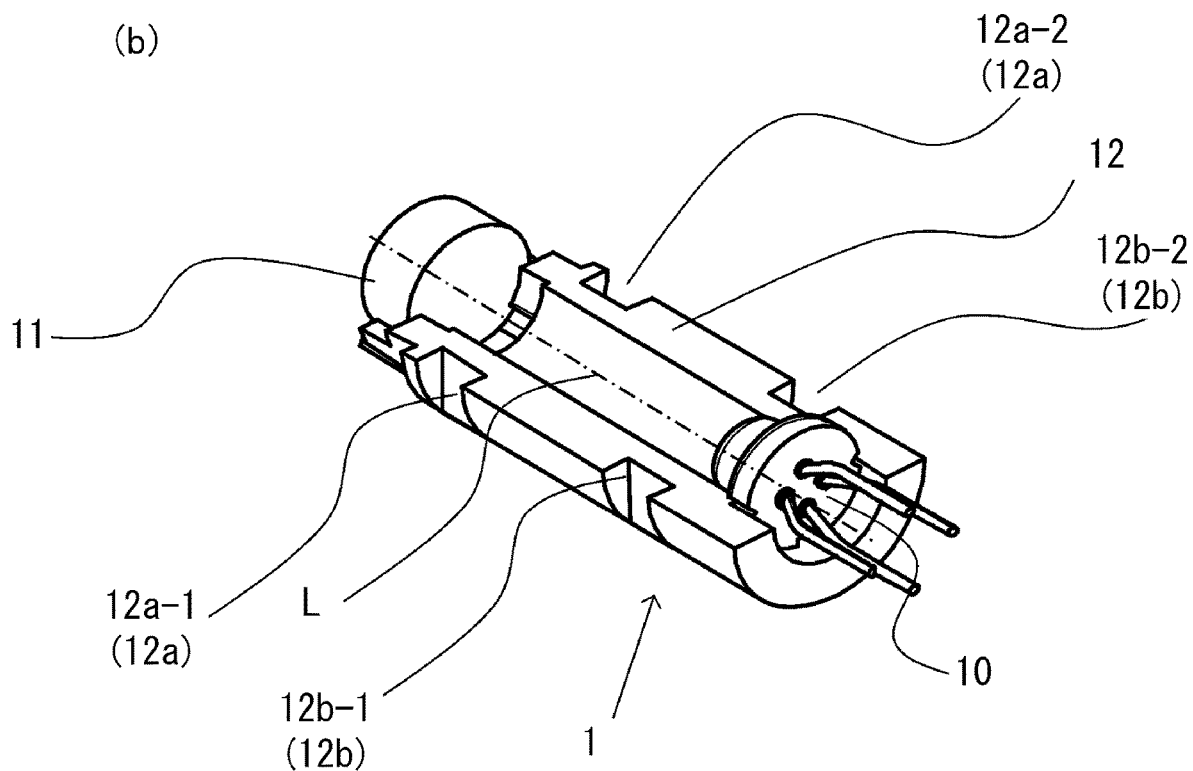
Figure 3:
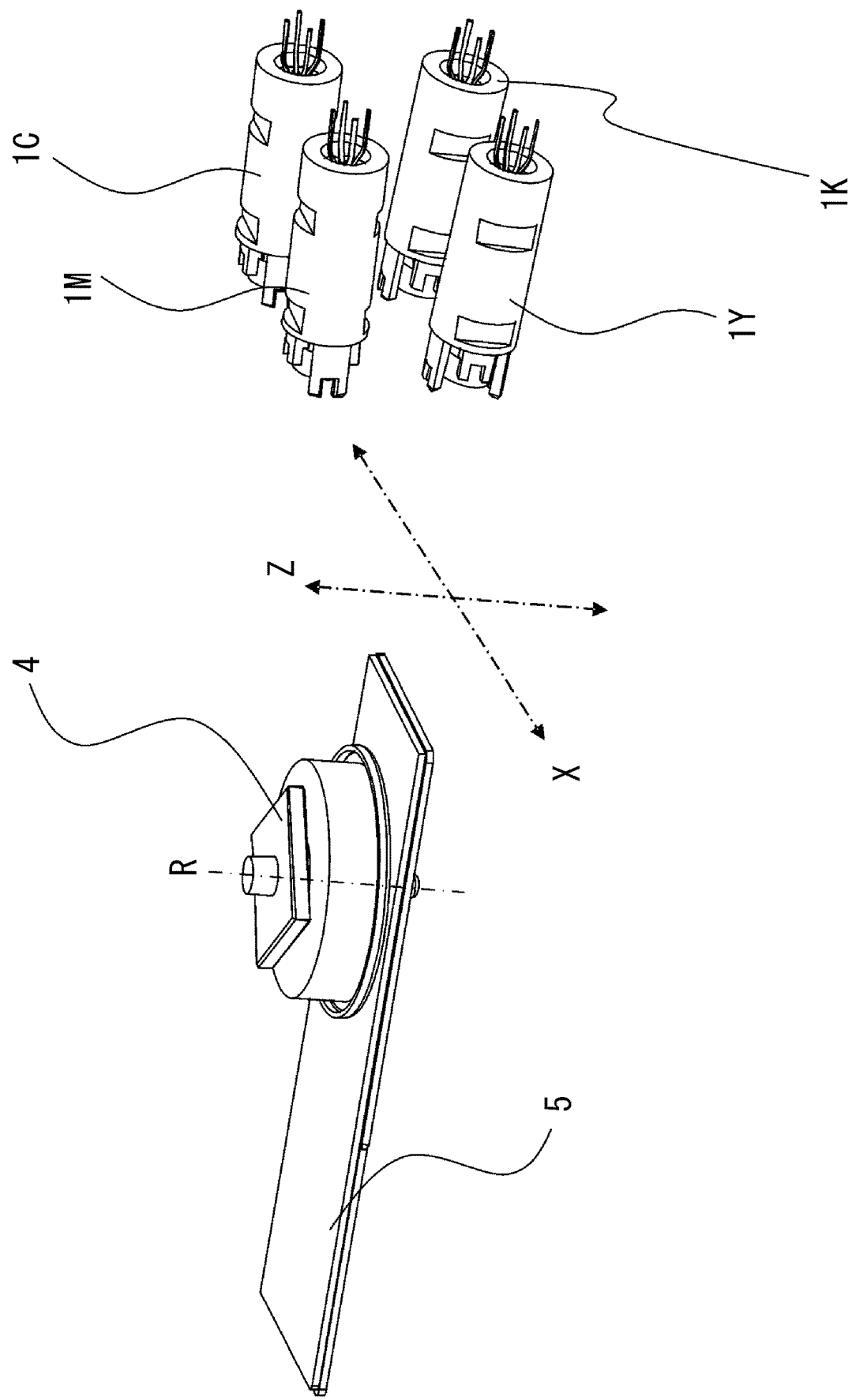
FIG. 3 is an external perspective view of the essential portions of the light source units in the preferred embodiment. It shows the positioning of the light source units in the preferred embodiment.
Figure 4:
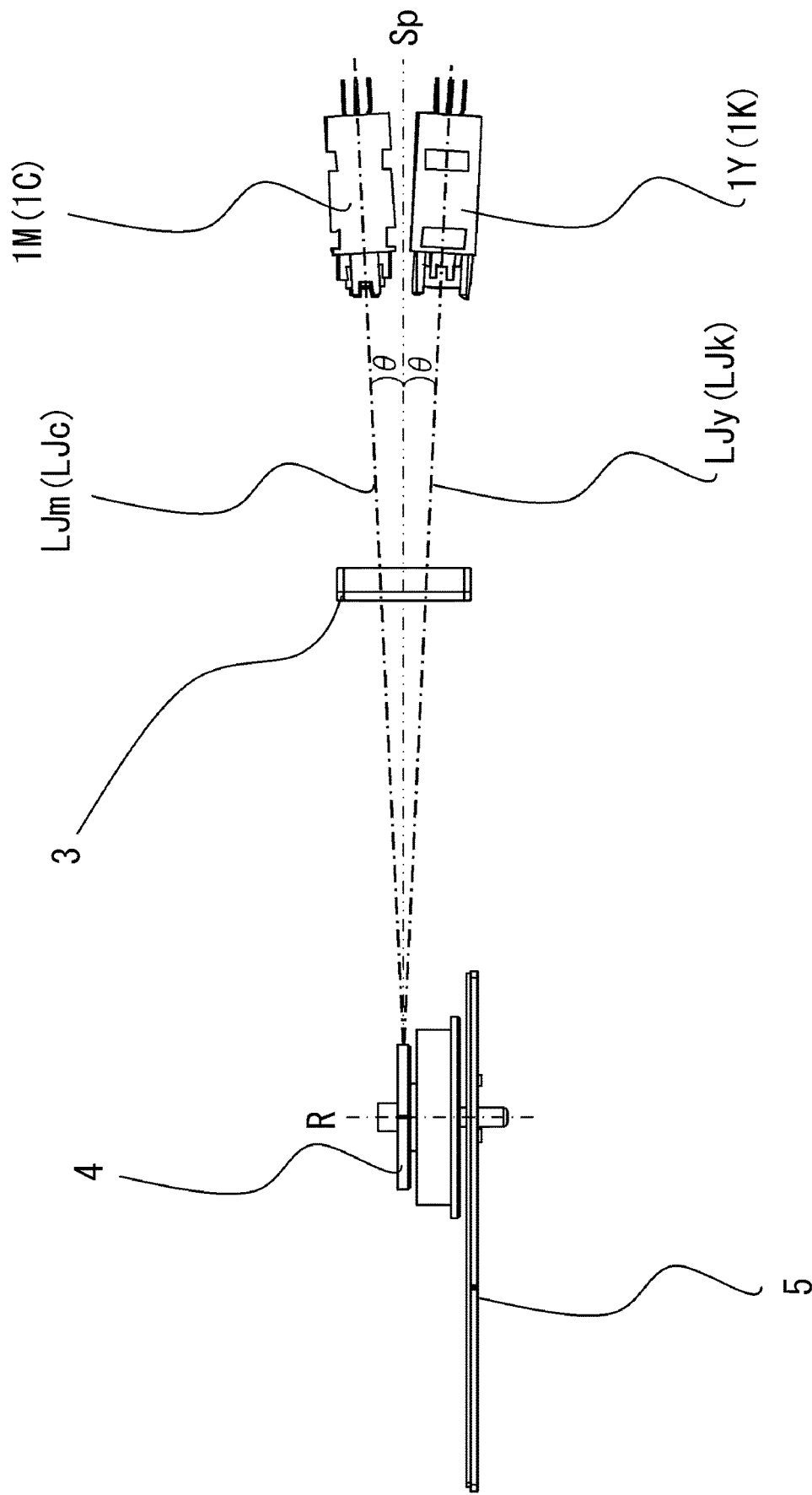
FIG. 4 is an external view of the essential portions of the scanning optical apparatus in the preferred embodiment; it shows the positioning of the light source units in terms of the secondary scan direction.

Next, referring to FIGS. 2, 3 and 4, the light source units 1 are described in detail. By the way, FIG. 2($a$) is an external perspective view of one of the light source units 1. FIG. 2($b$) is a sectional view of the light source unit 1. FIG. 3 is a drawing for showing the positioning of the four light source units 1. FIG. 4 is a drawing for showing the positioning of the light source units 1 in the secondary scanning direction, and the positioning of the deflection unit 5. Each light source unit 1 has a semiconductor laser 10, a collimator lens 11, and a cylindrical holder 12 formed of resin. The single-dot chain line L in FIG. 2($b$) stands for the centerline of the cylindrical portion of the holder 12. The peripheral surface portion of the holder 12 is provided with the first pair of slots 12$b$-1 and 12-$b$2, which are symmetrically positioned with reference to the central axis direction L of the cylindrical portion of the holder 12, and the second pair of slots 12a-1 and 12a-2, which are symmetrically positioned with reference to the central axis direction L the cylindrical portion of the holder 12. In terms of the direction parallel to the central axis direction L of the holder 12, the first and second pairs 12b and 12a of slots are positioned a preset distance apart from each other. More concretely, the pair 12a of slots are on the collimator lens side, and the pair 12b of slots are on the semiconductor lens side. The semiconductor laser 10 is held by the holder 12 by being inserted (pressed) into one of the lengthwise ends of the cylindrical portion of the holder 12. The collimator lens 11 is glued to the other end of the holder 12 after being adjusted in the position of the focal point of the beam of laser light projected from the semiconductor laser 10, and also, in the position of its optical axis.

Referring to FIG. 13, the light source units 1Y, 1M, 1C and 1K correspond one for one to the four photosensitive drums (FIG. 13) for forming a color image. The four light source units 1Y, 1M, 1C and 1K are similar in structure to the light source unit 1 shown in FIG. 2. Hereafter, the central axes of the holders 12Y, 12M, 12C and 12K of the light source units 1Y, 1M, 1C and 1K are referred to as central axes LY, LM, LC and LK, respectively. Here, the direction in which the beam of laser light is deflected by the deflection unit 5 in a manner to be made to scan an object is referred to as the primary scan direction. Further, the direction which is perpendicular to the primary scan direction, and is practically parallel to the rotational axis of the rotational polygonal mirror 4, is referred to as the secondary scan direction. In terms of the direction which is parallel to the rotational axis R of the deflection unit 5, the light source unit 1Y which is the first light source unit, and the light source unit 1M which is the second light source unit, are different in position from each other. Further, in terms of the secondary scan direction, the light source unit 1Y is positioned on the bottom side of the light source unit 1M. Similarly, in terms of the rotational axis R of the deflection unit 5, the light source unit 1K which is the first light source unit, and the light source unit 1C which is the second light source unit, are different in position from each other. Further, in terms of the secondary scan direction, direction which is parallel to the rotational axis R of the deflection unit 5, the light source unit 1K is positioned on the bottom side of the light source unit 1M, and the light source unit 1C is positioned on the top side of the light source unit 1K.

Referring to FIG. 4, referential codes LJy, LJm, LJc and LJk stand for four beams of laser light projected from the light source units 1Y, 1M, 1C and 1K, respectively. θ stands for the angle between the beam of laser light and the secondary scan direction. The angle θ is the angle between the beam LJ of laser light and a hypothetical plane Sp (double-dot chain line) which coincides with reflective surface and is roughly perpendicular to the rotational axis R of the rotational polygonal mirror 4. The beam LJy (LJk) of laser light projected from the light source unit 1Y (1K), and the beam LJm (LJc) projected from the light source unit 1M (1C) have to be made to hit one of the reflective surfaces of the rotational polygonal mirror 4 which are narrow in terms of the secondary scan direction. Therefore, the beam LJy (LJk) of laser light from the light source unit 1Y (1K) has to be made to hit one of the reflective surface of the rotational polygonal mirror 4 at an upward angle, whereas the beam LJy (LJk) of laser light from the light source unit 1M (1C) is has to be made to hit one of the reflective surfaces of the rotational polygonal mirror 4 at a downward angle. Therefore, the light source units 1Y and 1M are positioned apart by a preset distance in terms of the secondary scan direction.

The light source unit 1Y (1K) is positioned in such an attitude that the collimator lens side of the light source unit 1Y (1K), which is the opposite side of the light source unit 1Y (1K) from the side, by which the semiconductor laser 10 is held, is positioned higher than the semiconductor laser 10 side. The light source unit 1M (1K) is positioned in such an attitude that the collimator lens 11 side of the holder 12 is positioned lower than the side which has the semiconductor laser 10 which is the second light source. The casing 80 has to be provided with such supporting portions that can hold the four light source units 1Y, 1M, 1C and 1K in the attitude described above.

[Light Source Unit Supporting Portions of Casing]

Next, referring to FIG. 5, the light source units 1, and the light source unit supporting portions of the casing 80, are described about their structure which characterizes this embodiment. FIGS. 5(a), 5(b) and 5(c) are external perspective view of the essential portions of the light source unit supporting portions of the casing 80, top view of the essential portions, and sectional view of the essential portions at a plane D-D in FIG. 5(b), respectively. The single-dot chain lines in FIG. 5(a) stands for the central axis direction LY (LM) of the holder 12Y (12M) described above, and the central axis direction LK (LC) of the holder 12K (12C), one for one.

The casing 80 has four holding portions 81, per light source unit 1, to support the holder 12 from the bottom surface side. More specifically, there are four supporting portions 81 for supporting the light source unit 1 on the bottom side, and four holding portion 8 for supporting the light source unit 1 on the top side. That is, the casing 80 is provided with eight holding portions 8 which make up one set of holding portions 8. Thus, it may be said that the casing 80 has two sets of holding portions 8 (total of 16 holding portions), which coincide with a plane which is roughly perpendicular to the rotational axis direction of the rotational polygonal mirror 4. More concretely, the four supporting portions 81 for one light source unit 1 are supporting portions 81a, 81b, 81c and 81d. The supporting portion 81a supports the holder 12 which is on the collimator lens 11 side of the light source unit 1. The supporting portion 81c supports the holder 12 on the semiconductor laser 10 side of the light source unit 1. In terms of the direction indicated by an arrow mark X, the supporting portions 81a and 81c are positioned so that they are not in the adjacencies of the other light source units 1. The supporting portion 81b supports the holder 12 on the collimator lens 11 side of the light source unit 1. The supporting portion 81d supports the holder 12 on the semiconductor laser 10 side of the light source unit 1. In terms of the arrow X direction, the supporting portions 81b and 81d are positioned in the adjacencies of the other light source units 1. The supporting portions 81a and 81b, and supporting portions 81c and 81k are positioned so that after the attachment of the light source units 1 to the casing 80, they are roughly symmetrically positioned with reference to the central axes L (LY, LM, LC, LK) of the corresponding holders 12. Hereafter, when it is necessary to describe a component which is related to a specific color, a suffix Y, M, C or K is added to the end of the referential code for the component.

Next, referring to FIG. 5(a), the supporting portions 81 of the casing 80, which are related to four colors, one for one, are concretely described. The supporting portions 81aY and 81bY (which hereafter may be referred to as supporting portion 81Y), which are a pair of the second supporting portions, are positioned so that they coincide with a flat plane which is roughly perpendicular to the rotational axis of the rotational polygonal mirror 4 (aligned in rotation direction (axis X direction), support the holder 12Y of the light source unit 1Y. The supporting portions 81aM and 81bM which are a pair of the fourth supporting members which coincide with a flat plane which is roughly perpendicular to the direction parallel to the rotational axis of the rotational polygonal mirror 4, and a pair of the third supporting portions 81cC, and 81dC (which hereafter may be referred to as simply as 81C) support the holder 12C of the light source unit 1C. A pair of the second supporting portion 81aK and 81bK, which coincide with a flat plane which roughly perpendicular to the rotational axis of the rotational polygonal mirror 4, and a pair of the first supporting portions 81cK and 81dK (which hereafter may be referred to as supporting portion 81K), support the holder 12K of the light source unit 1K.

Regarding the supporting portion 81Y for supporting the light source unit 1Y which is attached on the bottom side with reference to the secondary scan direction, its supporting portions 81aY and 81bY are higher in position than the supporting portion 81cY and 81dY (FIG. 5(c)). Thus, after the attachment of the light source unit 1Y to the casing 80, the beam LJy of laser light enters the rotational polygonal mirror 4 at an upward angle θ. On the other hand, the supporting portions 18M for supporting the light source unit 1M which is attached on the top side in t terms of the secondary scan direction is lower in position than the supporting portions 81cM and 81dM (FIG. 5(c)). Thus, after the attachment of the light source unit 1M to the casing 80, the beam LJm of laser light hits the rotational polygonal mirror 4 at a downward angle θ. Similarly, regarding the supporting portion 81K for supporting the light source unit 1K attached to the bottom side in terms of the secondary scan direction, the supporting portions 81aK and 81bK are positioned higher than the supporting portions 81cK and 81dK. Thus, after the attachment of the light source unit 1K to the casing 80, the beam LJk of laser light hits the rotational polygonal mirror 4 at an upward angle θ. On the other hand, regarding the supporting portion 81C for supporting the light source unit 1C attached to the top side in terms of the secondary scanning direction, is supporting portions 81aC and 81bC are positioned lower than the supporting portions 81cC and 81dC. Thus, after the attachment of the light source unit 1C to the casing 80, the beam LJc of laser light hits the rotational polygonal mirror 4 at a downward angle θ.

Each supporting portion 81 has a supporting surface 8 (hatched portions in FIG. 5(a)) which contacts the peripheral surface of the cylindrical portion of the holder 12 of the light source unit 1. Regarding the supporting surface 8Y which the supporting portion 81 for supporting the light source unit 1Y has, its supporting portion 81aY has a supporting surface 8aY (second supporting surface), and the supporting portion 81bY has a supporting surface 8bY (second supporting surface). A supporting portion 81cY has a supporting surface 8cY (first supporting surface), and the supporting portion 81dY has a supporting surface 8dY (first supporting surface). The supporting surface 8Y of the supporting portion 81Y is angled so that it slants toward the central axis direction LY. A combination of the supporting surface 8aY and supporting surface 8b6 forms a part of the V-shaped portion, and a combination of supporting surfaces 8cY and 8dY forms a part of the V-shaped portion.

Regarding the supporting surface 8M which the supporting portion 81M for supporting the light source unit 1M, its supporting portion 81aM has a supporting surface 8aM (fourth supporting surface), the supporting portion 81bM has a supporting surface 8bM (fourth supporting surface). A supporting portion 81cM has a supporting surface 8cM (third supporting surface), and a supporting portion 81dM has a supporting surface 8dM (third supporting surface). The supporting surface 8M of the supporting portion 81M is angled so that it tilts toward the central axis direction LM. A combination of the supporting surfaces 8aM and 8bM forms a part of the V-shaved portion and a combination of the supporting surfaces 8cM and 8dM forms a part of the V-shaped portion.

Regarding the supporting surface 8C which the supporting portion 81C for supporting the light source unit 1C, its supporting portion 81aC has a supporting surface 8aC (fourth supporting surface), and the supporting portion 81bC has a supporting surface 8bC (fourth supporting surface). The supporting portion 81cC has a supporting surface 8cC (third supporting surface), and a supporting portion 81dC has a supporting surface 8dC (third supporting surface). The supporting surface 8C of supporting portion 81C is angled so that its downwardly tilts toward the central axis direction LC. A combination of the supporting surfaces 8cA and 8bC form a part of the V-shaped portion, and a combination of the supporting surfaces 8cC and 8dC forms a part of the V-shaped portion.

Regarding the supporting surface 8K which the supporting portion 81k has for supporting the light source unit 1K, its supporting portion 81dK has a supporting surface 8aK (second supporting surface), and its supporting portion 8bk has a supporting surface 81bK (second supporting surface). Its supporting portion 81cK has a supporting surface 8cK (first supporting surface), and its supporting portion 81dK has a supporting surface 8dK (first supporting surface). The supporting surface 8K of the supporting portion 81K is angled so that it downwardly tilts toward the central axis direction LK. A combination of the supporting surfaces 8aK and 8bK forms a part of the V-shaped portion, and a combination of the supporting surfaces 8cK and 8bK forms a part of the V-shaped portion. By the way, referring to FIG. 5, the supporting portions 81bM and 81bC are two portions of a single component, and the supporting portions 81bY and 81bK are the two portions of a single component. The supporting portions 81kM and 81dC are two portions of a single component, and the supporting portions 81dY and 81dK are two portions of a single component.

Next, referring to FIG. 3, the supporting portions of the casing 80 are described with reference to the light source unit 1Y, and the light source unit 1M which is positioned on the top side of the light source unit 1Y in terms of the secondary scanning direction. The supporting surfaces 8Y and 8M are the same in shape, and are symmetrically positioned with reference to the central axis direction LY, making up the slant surfaces like the slant portions of a letter V, one for one. In terms of the direction parallel to the central axis direction LY (LM), they are separated by a preset distance. The FOLLOWING may be easier to understand with reference FIG. 5(b). In terms of the direction parallel to the central axis direction LY (LM), the supporting surfaces 8 (supporting portions 81) are positioned in the following order, that is, in terms of the direction from the collimator lens 11 side to the semiconductor laser 10 side, the supporting surfaces 8Y and 8M are positioned in the order of a supporting surface 8aM, a supporting surface 8aY, a supporting surface 8cM, and a supporting surface 8cY. In terms of the direction parallel to the central axis direction LY (LM), that is, in terms of the collimator 11 to semiconductor laser 10 direction, the supporting surfaces 8C and 8K are positioned in the order of the supporting surface 8bM, supporting surface 8bY, supporting surface 8dM, and supporting surface 8dY. Further, in terms of the direction parallel to the central axis direction LK, that is, in terms of the collimator lens 11 side to the semiconductor laser 10 side direction, the supporting surfaces 8C and 8K are positioned in the order of supporting surfaces 8aC, 8aK, 8cC and 8cK. Moreover, in terms of the direction parallel to the central axis direction LK (LC), that is, in terms of the collimator lens 11 side to the semiconductor laser 10 side direction, the supporting surfaces 8C and 8K are positioned in the order of the supporting surfaces 8bC, 8bK, 8dC and 8dK. That is, with reference to the direction parallel to the central axis direction L, the supporting surface 8M (8C) for supporting the light source unit 1M (1C) on the top side, and the supporting surface 8Y (8K) for supporting the light source unit 1Y (1K) on the bottom side, are alternately positioned.

Next, referring to FIG. 5(c), in terms of the secondary scanning direction, the supporting surface 8Y (8K) is positioned on the bottom side, and the supporting surface 8M (8C) is on the top side. That is, the supporting portion 81M for supporting the light source unit 1M (1C), which is on the top side is positioned higher than the supporting portion 81Y (81K) for supporting the light source unit 1Y (1K), which is on the bottom side.

[Attachment of Bottom Light Source Units]
(Points of Contact of Light Source Unit, and Supporting Surface of Casing)

FIG. 6 is an external perspective view of the essential portions of the light source unit 1Y and casing 80, which are related to the attachment of the light source unit 1Y to the casing 80. It shows how the light source unit 1Y is attached to the casing 80. For ease of visual understanding, the supporting portions 81aM, 81aY, 81cM and 81cY of the casing 80 are not illustrated. The portion of the holder 12Y of the light source unit 1Y, which is contoured by a broken line and hatched, are the areas of the light source unit 1Y, by which the light source unit 1Y contacts the casing 80. In FIG. 6, they are on the back side of the light source unit 1Y.

The light source unit 1Y is attached to the casing 80 in such an attitude that the aforementioned slots 12a-1 and 12a-2 align in the direction of axis X, and also, the slots 12b-1 and 12b-2 align in the axis X. By the way, in FIG. 6, the slots 12a-2 and 12b-2 are on the back side of the holder 12Y of the light source unit 1Y, and therefore, are not visible. By the way, the area 13a-2 of the holder 12Y contacts the supporting surface 8bY of the supporting portion 81bY, and the area 13b-2 of the holder 12Y contacts the supporting surface 8aY of the unillustrated supporting portion 81aY. Here, the holder 12 contacts (areas 13a-1 and 13b-1 in FIG. 7(b)) similarly contacts the supporting surface 8aY of the supporting portion 81aY, and supporting surface 8cY of the supporting portion 81cY, which are not illustrated in FIG. 6.

(Slots of Light Source Unit 1Y, and Supporting Portion of Casing 80)

FIG. 7(a) is an external perspective view of a combination of the light source unit 1Y and casing 80 when the light source unit 1Y is in contact with the supporting surface 8Y of the casing 80. In order to make it easier to understand the relationship between the slots 12a and 12b of the holder 12Y of the light source unit 1Y, and the supporting portion 81 of the casing 80, certain portions of the casing 80 are not shown. When the light source unit 1Y is in the state shown in FIG. 7(a), the cylindrical portion of the holder 12Y of the light source unit 1Y is in contact with the supporting surface 8Y of the supporting portion 81Y. More concretely, the area 13a-1 of the holder 12Y of the light source unit 1Y is in contact with the supporting surface 8aY of the supporting portion 81aY, and the area 13b-1 of the holder 12Y of the light source unit 1Y is in contact with the supporting surface 8cy of the supporting portion 81cY. Further, the area 13a-2 of the holder 12Y of the light source unit 1Y is in contact with the supporting surface 8cY of the supporting portion 81bY, and the area 13b-2 of the holder 12Y of the light source unit 1Y is in contact with the supporting surface 8dY of the supporting portion 81dY (FIG. 7(b)).

When the light source unit 1Y is attached to the casing 80, the supporting portions 81M of the light source unit 1M which are to be positioned on the top side of the light source unit 1Y, fit into the slots 12a and 12b of the holder 12Y. More concretely, the light source unit 1M is slid into the casing 80 in such a manner that the supporting portion 81a is fits into the slot 12a-1 of the holder 12Y of the light source unit 1Y, and the supporting portion 81bM fits into the slot 12a2 of the holder 12Y of the light source unit 1Y. Further, the supporting portion 81cM fits into the slot 12b-1 of the holder 12Y of the light source unit 1Y, and the supporting portion 81dM fits into the slot 12b-2 of the holder 12Y of the light source unit 1Y.

(Attachment of Light Source Unit 1K)

The light source unit 1K is also attached to the casing 80 with the use of the similar structural arrangement. More concretely, it is attached in such a manner that the area 13a-1 of contact of the holder 12K which is the first holder of the light source unit 1K contacts the supporting surface 8aK of the supporting portion 81aK, and the area 13b-1 of contact of the holder 12K contacts the supporting surface 8cK of the supporting portion 81cK. Further, the area 13a-1 of the holder 12K of the light source unit 1K contacts the supporting surface 8cK of the supporting portion 81cK. Further, the area 13a-2 of the holder 12K of the light source unit 1K contacts the supporting surface 8bk of the supporting portion 81bK, and the area 13b-2 of the holder 12K of the light source unit 1K contacts the supporting surface 8dK of the supporting portion 81dk. Further, the holder 12K of the light source unit 1K is fitted into the casing 80 in such a manner that the supporting portion 81bC fits into the slot 12a-1 of the holder 12K of the light source unit 1K, and the supporting portion 81bC fits into the slot 12a-1 of the holder 12K of the light source unit 1K. Further, the supporting portion 81cC fits into the slot 12b-1 of the holder 12K of the light source unit 1K, and the supporting portion 81dC fits into the slot 12b-2 of the holder 12K of the light source unit 1K. As described above, the supporting portion 81 for supporting the light source unit 1 on the top side fits into the slots 12a and 12b of the holder 12 of the light source unit 1 on the bottom side. Therefore, this embodiment can reduce the distance between the supporting portions 81 in the direction parallel to axis X, compared to a conventional light source unit, which does not have the slots 12a and 12b.

[Attachment of Light Source Unit on Bottom Side]

FIGS. 8(a) and 8(b) are drawings of a combination of light source units 1Y and 1K, which are positioned on the bottom side in terms of the sheet conveyance direction, and casing 80, when the light source units 1Y and 1K are attached to the casing 80. For visual clarity, the supporting portions 81aM, 81bM, 81aC and 81bC of the casing 80, and their adjacencies, are not illustrated in FIGS. 8(a) and 8(b). The light source units 1Y and 1K, which are to be positioned on the bottom side are held to the casing 80 by a fixation spring 20, as the first leaf spring, which is fixed to the casing 80. The fixation spring 20 is provided with a pair of holes 22 and a pair of holes 23. The holes 22 are in the lengthwise end portions of the fixation spring 20, one for one. In terms of the lengthwise direction of the fixation spring 20, the holes 23 are on the inward side of the holes 22. Further, the fixation spring 20 is provided with a pair of pressing portions 21a and 21b, which are perpendicularly protrusive from one of the long edges of the fixation spring 20. As for the casing 80, it is provided a pair of spring seats 820, which are for accommodating the fixation spring 20. Each spring seat 820 is provided with a hole 822 which corresponds to one of the holes 22 of the fixation spring 20. In terms of the direction parallel to axis X, one of the two spring seats 820 is on the supporting portion 81aY side, and is higher in position than the supporting portion 81aY. The other spring seat 820 is on the supporting portion 81aK side, and is higher in position than the supporting portion 81aK. Referring to FIG. 8(b), the holes 23 of the fixation spring 20 are located so that as the fixation spring 20 is attached to the spring seats 820 with screws 30, the holes 23 are not blocked by the spring seats 820. By the way, the two holes 23 will be described later with reference to FIG. 12.

The fixation spring 20 is to be placed in contact with the spring seat 820 from the top side of both the light source unit 1Y and light source unit 1K, in such an attitude that its pressing portions 21a and 21b faces toward the semiconductor laser 10. Then, a pair of screws 30 are to be screwed into the two pairs of holes 22 to attached the fixation spring 20 to the casing 80. As the screws are screwed into the holes 22, the pressing portion 21a of the fixation spring 20 presses on the holder 12Y of the light source unit 1Y, and the pressing portion 21b of the fixation spring 20 presses on the holder 12K of the light source unit 1K. The light source unit 1Y which is positioned on the bottom side in terms of the sheet conveyance direction, is pressed on the supporting surfaces 8aY, 8bY, 8cY and 8dY of the casing 80 by the force generated by the elasticity of the fixation spring 20. As for the light source unit 1K, it is pressed on the supporting surfaces 8aK, 8bK, 8cK and 8dK of the casing 80 by the force generated by the elasticity of the fixation spring 20. Consequently, the light source units 1Y and 1K are supported by the surfaces (upwardly facing surfaces) which face in the opposite direction from the gravity direction. Since they are held to the casing 80 by the force generated by the elasticity of the fixation spring 20, it is possible to prevent the light source units 1Y and 1K from being displaced by external force in the direction parallel to the gravity direction. A line J-J will be described later.

[Attachment of Light Source Unit on Top Side]
(Areas of Contact of Light Source Unit 1M, and Supporting Surfaces of Casing 80)

FIG. 9(a) is an external perspective view of the essential portions of a combination of the light source unit 1M, which is positioned on the top side, and light source unit 1Y which is positioned on the bottom side, and the casing 80. It shows how the light source unit 1M is attached to the casing 80. FIG. 9(b) is a sectional view of the aforementioned combination at a line E-E in FIG. 9(a). By the way, for ease of understanding, the supporting portions 81aM, 82aY, 81cM and 81cY of the casing 80, and their adjacencies, are not shown in FIG. 9(b). A hatched rectangular portion of the holder 12M which is the second holder of the light source unit 1M are areas of contact 13a-1 and 13b-2. In FIG. 9, they are on the opposite side of the light source unit 1M.

The light source unit 1M is attached to the casing 80 in such an attitude that the slots 12a-1 and 12a-2 of the holder 12M of the light source unit 1M align in parallel in the secondary scanning direction (axis Z direction), and also, the slots 12b-1 and 12b-2 align in parallel in the secondary scanning direction. By the way, the area 13a-1 of contact of the holder 12M contacts the supporting surface 8bM of the supporting portion 81dM, and the area 13b-2 of contact of the holder 12M contacts the supporting surface 8bM of the supporting portion 81dM. Here, the holder 12 (area 13a-1 of contact in FIG. 9(b)) similarly contacts the supporting surface 8aM of the supporting portion 81aM, which is not shown in FIG. 9(a), and supporting surface 8cM of the supporting portion 81cM. That is, the holder 12 is shared by the light source units 1Y and 1M which are aligned in parallel in the secondary scanning direction.

The light source unit 1C also is attached to the casing 80 with the use of similar structural arrangement. More concretely, the area 13b-1 of contact of the holder 12C, which is the second holding portion of the light source unit 1C contacts the supporting surface 8aC of the supporting portion 81aC, and the area 13b-1 of contact of the holder 12C of the light source unit 1C contacts the supporting surface 8cC of the supporting portion 81cC. Further, the area 13a-2 of contact of the holder 12C of the light source unit 1C contacts the supporting surface 8bC of the supporting portion 81bC, and the area 13b-2 of contact of the holder 12C of the light source unit 1C contacts the supporting surface 8dC of the supporting portion 81dC.

[Attachment of Top Light Source Unit]

FIGS. 10(a) and 10(b) are drawings for showing how the light source units 1M and 1C, which are to be positioned on the top side in terms of the secondary scanning direction, are attached to the casing 80. For ease of visual understanding, the supporting portions 81aM, 81bM, 81aC and 81bC, and their adjacencies, are not shown. Also when the light source units 1M and 1C, which are to be placed on the top side, to the casing 80, a fixation 20, which is the same in shape as the one used to attach the light source units 1Y and 1K to the casing 80, is used. The casing 80 has two spring seats 840 to which the fixation spring 20, which is the second leaf spring, is seated. The spring seat 840 is provided with a pair of holes 842, which correspond to the pair of holes 22 of the fixation spring 20. In terms of the axis X direction, one of the pair of spring seats 840 is on the supporting portion 81cM side, and is higher in position than the supporting portion 81cM. The other spring seat 840 is on the supporting portion 81cC side, and is higher in position than the supporting portion 81cC. Further, the spring seats 840 are on the semiconductor laser 10 side of the spring seats 820, and are positioned higher than the spring seats 820. Referring to FIG. 10(b), the holes 23 of the fixation spring 20 are position so that as the fixation spring 20 is attached to the spring seats 840 with springs 30, they are not blocked by the spring seats 840.

When the light source units 1M and 1C are attached to the casing 80, the fixation spring 20 is aligned with the spring seats 840, from the top side of the light source units 1M and 1C, in such an attitude that the pressing portions 21a and 21b of the fixation spring 20 face the collimator lens 11. Then, screws 30 are put through the pair of holes 22, and screwed into the pair of holes 84, one for one, to attached the fixation spring 20 to the casing 80. Consequently, the pressing portion 21b of the fixation spring 20 presses on the holder 12M of the light source unit 1M, and the pressing portion 21a of the fixation spring 20 presses on the holder 12C of the light source unit 1C. That is, the light source units 1M and 1C, which are to be on the top side, are attached to the casing 80 with the fixation spring 20, as if the fixation spring 20 for attaching the light source units 1Y and 1K to the casing 80 were rotated by 180 degrees. The light source unit 1M, which is to be positioned on the top side in terms of the secondary scanning direction, is pressed on the supporting surfaces 8aM, 8bM, 8cM and 8dM of the casing 80 by the force generated by the elasticity of the fixation spring 20, and the light source unit 1C is pressed on the supporting surfaces 8aC, 8bC, 8cC and 8dC of the casing 80 by the force generated by the elasticity of the fixation spring 20. Thus, the light source units 1M and 1C are supported by surfaces (upwardly facing surfaces) which face in the opposite direction from the gravity direction, and are held to the casing 80 by the force generated by the elasticity of the fixation spring 20. Therefore, they are prevented from being displaced by the external force which is parallel to the gravity direction. Further, there is no component between the light source units 1Y and 1K, which align in parallel in axis X direction, and also, between the light source units 1C and 1M, which align in the secondary scan direction. Therefore, it is unlikely that any of the light source units 1 becomes nonuniform in its ambient temperature.

[Adjustment of Light Source Unit in Rotational Phase]

FIG. 11 is a drawing for describing the method for adjusting the light source units 1 in rotational phase. It is a drawing of a combination of the four light source units 1, and casing 80, as seen from the semiconductor laser 10 side of the light source unit 1. AY, AK, AM and AC stand for the directions in which the holders 12Y, 12K, 12M and 12C of the light source units 1Y and 1K are rotatable, respectively. Unless it is necessary to describe the light source units 1 about the colors to which they are related, the rotational direction of the holder 12 will be referred to as direction A. After the attachment of the light source unit 1 to the casing 80 with the fixation springs 20, the light source units 1 remain pressed on the casing 80 by the fixation springs 20. However, they are not unmovable as they will be if they are glued to the casing 80. That is, even after the attachment of the light source units 1 to the casing 80, the light source units 1 are movable relative to the casing 80, that is, rotatable about the central axis direction L of the holder 12.

The semiconductor laser 10 of each light source unit 1 is enabled to project two, for example, beams of laser light. Thus, it can scan the peripheral surface of the photosensitive drum 1 with two beams of laser light, to form a latent image on the peripheral surface of the photosensitive drum 1. In order to adjust the light source unit 1 in the distance between the two spots, which the two beams of laser light projected from the semiconductor laser 10 form, per sweep (scan), on the object to be scanned (photosensitive drum 1), to a value which corresponds to the image resolution in the secondary scanning direction, the light source unit 1 is rotationally moved in the direction A. This adjustment will be referred to as phase adjustment, hereafter. Known (conventional) phase adjustment which has been carried out by a conventional light source unit 1 which is similar in structure and function to the one in this embodiment can be similarly carried out by the light source unit 1 in this embodiment.

[Gluing of Light Source Unit to Casing 80]

FIG. 12 is a sectional drawing of a combination of the four light source units 1, and the casing 80, at a plane J-J in FIG. 8(b) (after completion of phase adjustment and gluing). It is for describing the process of gluing the light source units 1 to the casing 80. The light source units 1Y and 1K are under the pressure from fixation spring 20, and a nozzle 40 is inserted into the hole 23 of the fixation spring 20, which is on the light source unit 1K side. It is for guiding glue P downward into the gap between the cylindrical portion of the holder 12K of the light source unit 1K, and the supporting surface 8aK of the supporting portion 81aK. As the glue P is guided into the aforementioned gap, the light source unit 1K and casing 80 become glued to each other. Further, the nozzle 40 is inserted into the hole 23 of the fixation spring 20, which is on the light source unit 1Y side, to pour the glue P into the gap between cylindrical portion of the holder 12Y of the light source unit 1Y and the supporting surface 8aY of the supporting portion 81aY. By the way, the portion of the fixation spring 20, which is on the inward side of the pair of holes 23 in terms of the lengthwise direction of the fixation spring 20, may be provided with a pair of holes, into which the nozzle 40 can be inserted to pour the glue P between the cylindrical portion of the holder 12K of the light source unit 1K, and the supporting surface 8bK of the supporting portion 81bK of the casing 80, and also, between the cylindrical portion of the holder 12Y of the light source unit 1Y, and the supporting surface 8bY of the supporting portion 81bY of the casing 80.

Similarly, the light source units 1M and 1C are under the pressure from the fixation spring 20. The nozzle 40 is inserted into the hole 23 of the fixation spring 20, which is on the light source unit 1C side, to pour the glue P between the cylindrical portion of the holder 12C of the light source unit 1C, and the supporting surface 8cC of the supporting portion 81cC of the casing 80. Further, the nozzle 40 is inserted into the hole 23 of the fixation spring 20, which is on the light source unit 1M side, to pour the glue P between the cylindrical portion of the holder 12M of the light source unit 1M, and the supporting surface 8cM of the supporting portion 81cM of the casing 80. By the way, the portion of the fixation spring 20, which is on the inward side of the two holes 23 of the fixation spring 20 in terms of the lengthwise direction of the fixation spring 20, may be provided with holes so that the nozzle 40 can also be inserted into these additional holes to pour the glue P between the cylindrical portion of the holder 12C of the light source unit 1C, and the supporting surface 8dC of the supporting portion 81dC of the control portion 30, and also, between the cylindrical portion of the holder 12M of the light source unit 1M, and the supporting surface 8dM of the supporting portion 81dM of the casing 80.

The four light source units 1 are fixed to the casing 80 while being positioned relative to the casing 80 as described above with reference to FIG. 3. Referring to FIG. 3, the light source units 1Y and 1K, which are on the bottom side, are positioned so that their slots 12a (slots 12b, as well) align in parallel in axis X direction. On the other hand, the light source units 1M and 1C, which are on the top side, are positioned so that their slots 12a (slots 12b) align in parallel in the direction (axis Z direction) which is parallel to the rotational axis R of the rotational polygonal mirror 4. That is, it may be said that the light source units 1Y and 1K, which are on the bottom side, and the light source units 1M and 1C, which are on the top side, are positioned so that they are different from each other by 90 degrees in the position of the slots of their holder 12. Therefore, the shape of the light source unit 1, which was described with referent to FIG. 2, can be shared by the four light source units 1Y, 1M, 1C and 1K.

The specific effects of this embodiment may be summarized as follows:

This embodiment makes it possible to make the light source unit supporting surfaces 8 of the casing 80 the same in the direction they face (upwardly facing surfaces). Therefore, it makes it possible to form the casing 80 with the use of only a single mold, making it possible to improve the casing 80 in the accuracy of the supporting surfaces 8. Therefore, it makes it possible to realize a scanning optical apparatus which is substantially superior in optical performance than any conventional scanning optical apparatus.

Further, it makes it unnecessary to partition any of the light source units 1 from adjacent ones, making it unlikely for the four light source units 1 to become different in their ambient temperature. Therefore, the components which make up the light source unit 1 are unlikely to become different in the amount of deformation attributable to thermal expansion. Therefore, it makes it possible to reduce the light source unit 1 from deteriorating in optical properties. Further, all the light source units 1 are supported by such surfaces (upwardly facing surfaces) which face opposite direction from external force which is parallel to the gravity direction. Therefore, this embodiment can prevent the light source units 1 from being reduced in the accuracy of the positioning of its components, by the external force which is generated in the gravity direction as the scanning optical apparatus is dropped, or in the like incidence.

Further, the supporting portion 81 for supporting the light source unit 1 on the top side is fitted in the slot 12 of the light source unit 1 which is on the bottom side, making it unnecessary to increase the V-shaped contacting surfaces of the light source unit on the top side in the measurement in the primary scan direction. Therefore, it is possible to reduce a scanning optical apparatus in the distance between the top and bottom light source units 1. Further, the holder 12 of the light source unit 1, and that of another holder 12, are vertically stacked in such a manner that they are different in rotational phase by 90 degrees. Therefore, the cylindrical portion of the holder 12 can be placed in contact with the V-shaped supporting surface 8, making it possible for the holder 12 to be shared by the top and bottom light source units 1. Further, the fixation spring 20 is provided with holes, through which a nozzle can be put, to glue the light source unit 1 and casing 80 to each other. Therefore, it is possible to prevent the light source unit 1 from being displaced.

By the way, in the embodiment described above, the peripheral surface portion of the cylindrical portion of the holder 12 of the light source unit 1 is provided with the pair of slots 12a, which are the same in shape and are symmetrical positioned relative to the central axis direction L, and a pair of slots 12b which are the same in shape and are symmetrically positioned relative to the central axis direction L (total of four slots 12). However, the embodiment was not intended to limit the present invention in terms of the count, shape, and positioning of the slots 12. For example, the holder 12 may be provided with only one slot 12a and one slot 12b (total of two slots), which are positioned on the same side of the central axis direction L. In such a case, the scanning optical apparatus may be structured so that the two supporting portions of the casing, which are not adjacent to the other light source unit 1, fit into the slots 12 of the light source unit 1 on the bottom side, or the two supporting portion of the casing, which are adjacent to the other light source unit, fits into the slots 12 of the two slots 12 of the light source unit 1. Providing only on side of the holder 12, with reference to the central axis direction L, with a pair of slots makes it possible to reduce the light source unit 1 in the distance between the supporting portions of the casing 80 in terms of axis X direction, compared to a light source unit 1 which is provided with no slot. Further, this embodiment is not intended to limit the present invention in terms of whether or not a holder is to be provided with a slot, whether or not the casing is to be provided with a supporting portion, and where the slots and supporting portions are to be positioned, etc.

[Image Forming Apparatus]

Lastly, an image forming apparatus in which the scanning optical apparatus S1 in this embodiment can be mounted is described. FIG. 13 is a sectional view of an image forming apparatus in which the scanning optical apparatus S1 described above is mountable. It is for showing the structure of the image forming apparatus. The image forming apparatus in FIG. 13 is a color laser beam printer of the so-called tandem type, for example. This laser beam printer (which hereafter will be referred to simply as printer) is provided with four image formation engines 1010Y, 1010M, 1010C, and 1010K (surrounded by single-dot chain line) for forming yellow (Y), magenta (M), cyan (C) and black (K) toner images, one for one. The printer is also provided with an intermediary transfer belt 1020, which is an intermediary transferring member, onto which toner images are transferred in layers from the image formation engines 1010Y, 1010M, 1010C and 1010K. After being transferred in layers onto the intermediary transfer belt 1020, the four toner images, different in color, are transferred onto a sheet S of paper, which is recording medium, forming thereby a full-color image. Hereafter, referential codes Y, M, C and K which indicates colors, are not shown unless necessary.

The intermediary transfer belt 1020 is endless. It is suspended by a pair of belt conveyance rollers 1021 and 1022, in such a manner that the belt 1020 bridges the two belt conveyance rollers 1021 and 1022. The image forming apparatus is structured so that the toner images formed by the image formation engines 1010 are transferred onto the intermediary transfer belt 1020 while the intermediary transfer belt 1020 is rotationally moved in the direction indicated by an arrow mark H. Further, the image forming apparatus is provided with a secondary transfer roller 1016, as a transferring means, which is positioned in a manner to oppose the belt conveyance roller 1021, with the presence of the intermediary transfer belt 1020 between itself and the belt conveyance roller 1021. The color toner image on the intermediary transfer belt 1020 is transferred onto the sheet S of paper while the sheet S is put through the interface between a secondary transfer roller 1060 and intermediary transfer belt 1020, which are kept pressed upon each other. There are positioned in tandem the four image formation engines 1010Y, 1010M, 1010C and 1010K, on the bottom side of the intermediary transfer belt 1020. The four toner images formed in accordance with the information of the four images which are different in color are transferred onto the intermediary transfer belt 1020 (which hereafter will be referred to as primary transfer). These four image formation engines 1010 are position in the order of yellow, magenta, cyan, and black color in terms of the direction parallel to the rotational direction (indicated by arrow mark H) of intermediary transfer belt 1020.

Further, there are disposed the scanning optical apparatus S1 for exposing the peripheral surface of each of the four photosensitive drums 1050, which are photosensitive members (members to be scanned), and with which the four image formation engines are provided, one for one, in accordance with the information of the image to be formed. The scanning optical apparatus S1 is shared by all the image formation engines 1010Y, 1010M, 1010C and 1010K. It is provided with four semiconductor lasers, unshown in FIG. 13, which project beams of laser light while modulating the beams with the information of the primary colors of the image to be formed.

Further, each image formation engine 1010 is provided with the photosensitive drum 1050, and a charge roller 1012 for uniformly charging the photosensitive drum 1050 to a background potential level. Moreover, it is provided with a developing device 1013, which is a means for developing the electrostatic latent image formed on the peripheral surface of the photosensitive drum 1050 (object to be scanned) through the process of exposing the peripheral surface of the photosensitive drum 1050 to the aforementioned beams of laser light, into a toner image. Further, there is disposed a primary transfer roller 1015, in a position which opposes the photosensitive drum 1050, with the presence of the intermediary transfer belt 1020 between itself and photosensitive drum 1050. As a preset transfer voltage is applied to the primary transfer roller 1015, the toner image on the photosensitive drum 1050 is transferred onto the intermediary transfer belt 1020.

Meanwhile, the sheet S of paper is fed into the main assembly of the image forming apparatus 1, more specifically, the secondary transfer position, which is the interface between the intermediary transfer belt 1020 and secondary transfer roller 2060, from a sheet feeder cassette 1002 which is in the bottom portion of the casing 1001 of the printer. Further, there is disposed a combination of a pickup roller 1024 and a feed roller 1025 for pulling the sheets S of paper in the sheet feeder cassette 1002 out of the sheet feeder cassette 1002, one by one, which is on the top side of the sheet feeder cassette 1002. Moreover, there is disposed in a position which opposes the feed roller 1025, a retard roller 1026 for preventing two or more sheets S of paper from being moved out of the sheet feeder cassette 1002. The internal sheet conveyance passage 1027 of the printer, through which the sheet S of paper is conveyed, is roughly vertically positioned along the right wall of the casing 1001 of the printer. As the sheet S of paper is pulled out of the sheet feeder cassette 1002 which is in the bottom portion of the casing 1001 of the printer, it is moved upward through the sheet passage 1027, and then, is delivered to a pair of registration rollers 1029 for adjusting the sheet S in timing with which the sheet S is allowed to enter the secondary transfer position. Thereafter, a toner image is transferred onto the sheet S in the secondary transfer position. Then, the sheet S is sent to a fixing device 1003 (surrounded by rectangle contoured by broken line), as a fixing means, which is provided on the downstream side of the secondary transfer position in terms of sheet conveyance direction. In the fixing device 1003, the unfixed toner image is fixed to the sheet S of paper. Then, the sheet S is put through the interface of the pair of discharge rollers 1028, and then, is discharged into a delivery tray 1001*a*, which is a part of the top wall of the casing 1001 of the printer. The first step which is taken by the color laser beam printer structured as described, to form a full-color image is for the scanning optical apparatus S1 of the printer to expose the photosensitive drum 1050 of each image formation engine 1010 with preset timing.

As described above, this embodiment of the present invention makes it possible to realize a scanning optical apparatus, which is substantially more accurate in the position of its multiple light source units, smaller in the amount of reduction in optical performance, smaller, and easier to operate, than any conventional scanning optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-090487 filed on May 25, 2020, which is hereby incorporated by reference herein in its entirety.

What is claimed is:

1. A scanning optical apparatus comprising:
    a first light source unit provided with a first light source and a cylindrical first holding member for holding said first light source;
    a second light source unit provided with a second light source and a cylindrical second holding member for holding said second light source;
    a deflection unit provided with a rotary polygon mirror for deflecting laser beams emitted from said first light source and said second light source; and
    a casing provided with a bottom surface on which said deflection unit is disposed,
    wherein said second light source unit is disposed further from the bottom surface than said first light source unit with respect to a rotational axis direction of said rotary polygon mirror,
    wherein said casing is provided with a first supporting surface for supporting said first light source unit and a second supporting surface for supporting said second light source unit,
    wherein both the first supporting surface for supporting said first light source unit and the second supporting surface for supporting said second light source unit are faced in a direction opposite to a direction facing the bottom surface, and are faced in the same direction as each other,
    wherein said first light source unit and said second light source unit are mounted to the first supporting surface and the second supporting surface corresponding to said first light source unit and said second light source unit in the same direction along the rotational axis direction, and
    wherein said first light source unit is mounted to the first supporting surface through a mounting space for said second light source unit, and said second light source unit is mounted to the second supporting surface without passing through a mounting space for said first light source unit.

2. A scanning optical apparatus according to claim 1, wherein said casing includes
    a pair of first supporting portion configured to support said first holding member in a held side of said first light source by said first holding member with respect to a central axis direction of said first holding member,
    a pair of second supporting portion configured to support said first holding member in a side opposite to the held side of said first light source by said first holding member with respect to the central axis direction of said first holding member,
    a pair of third supporting portion configured to support said second holding member in a held side of said second light source by said second holding member with respect to a central axis direction of said second holding member, and
    a pair of fourth supporting portion configured to support said second holding member in a side opposite to the held side of said second light source by said second holding member with respect to the central axis direction of said second holding member, and
    wherein said pair of first supporting portion and said pair of second supporting portion comprise the first supporting surface, and said pair of third supporting portion and said pair of fourth supporting portion comprise the second supporting surface.

3. A scanning optical apparatus according to claim 2, wherein in a state in which said first holding member is supported by said first supporting portion and said second supporting portion, said first holding member is provided with a concave first notched portion through which said third supporting portion is inserted and a concave second notched portion through which said fourth supporting portion is inserted.

4. A scanning optical apparatus according to claim 2, wherein said first holding member and said pair of first supporting portion are adhesively fixed, and
wherein said second holding member and said pair of third supporting portion are adhesively fixed.

5. A scanning optical apparatus according to claim 2, wherein as seen in the rotational axis direction, said pair of first supporting portion, said pair of second supporting portion, said pair of third supporting portion and said pair of fourth supporting portion are provided in an order of said pair of first supporting portion, said pair of third supporting portion, said pair of second supporting portion and said pair of fourth supporting portion from the held side of said first light source by said first holding member with respect to the central axis direction of said first holding member.

6. A scanning optical apparatus according to claim 2, wherein said pair of second supporting portion is higher than said pair of first supporting portion, and said pair of fourth supporting portion is lower than said pair of third supporting portion with respect to the rotational axis direction of said rotary polygon mirror.

7. A scanning optical apparatus according to claim 2, further comprising
a first leaf spring for urging, in the held side of said first light source by said first holding member, toward the bottom surface, and
a second leaf spring for urging, in the side opposite to the held side of said second light source by said second holding member, toward the bottom surface.

8. A scanning optical apparatus according to claim 2, further comprising
another said first light source unit,
another said second light source unit, and
another pair of said first supporting portion, said second supporting portion, said third supporting portion and said fourth supporting portion.

9. An image forming apparatus comprising
a scanning optical apparatus according to claim 1;
a plurality of photosensitive members on which electrostatic latent images are formed by a plurality of laser beams emitted from said scanning optical apparatus, respectively; and
a plurality of developing units, corresponding to said photosensitive member, respectively, configured to develop the electrostatic latent images formed on said plurality of photosensitive members and to form toner images.

10. A scanning optical apparatus comprising:
a first light source unit provided with a first light source emitting a first laser beam and a cylindrical first holding member for holding said first light source;
a second light source unit provided with a second light source emitting a second laser beam and a cylindrical second holding member for holding said second light source;
a deflection unit provided with a rotary polygon mirror for deflecting the first and second laser beams emitted from said first light source and said second light source; and
a casing supporting said first light source unit, said second light source unit, and said deflection unit, said casing includes a first supporting portion for supporting said cylindrical first holding member of said first light source unit and a second supporting portion for supporting said cylindrical second holding member of said second light source unit,
wherein said first light source unit and said second light source unit are mounted to the first supporting portion and the second supporting portion corresponding to said first light source unit and said second light source unit in the same direction along the rotational axis direction,
wherein said second light source unit is disposed at a position different from a position of said first light source unit with respect to a rotational axis direction of said rotary polygon mirror,
wherein said cylindrical first holding member includes a concave first notched portion recessed in a radial direction of said cylindrical first holding member and extends along the rotational axis direction,
wherein when said first light source unit is mounted to said first supporting portion along the rotational axis direction, said second supporting portion is inserted into said concave first notched portion, and
wherein said second light source unit is mounted to said second supporting portion after said first light source unit is mounted to said first supporting portion.

11. A scanning optical apparatus according to claim 10, wherein said cylindrical second holding member of said second light source unit includes a concave second notched portion recessed in a radial direction of said cylindrical second holding member and extends along a direction intersecting the rotational axis direction when viewed in a central axis direction of said first holding member.

12. A scanning optical apparatus according to claim 10, wherein first supporting portion includes a pair of first supporting portion configured to support said first holding member in a held side of said first light source by said first holding member with respect to a central axis direction of said first holding member, and a pair of second supporting portion configured to support said first holding member in a side opposite to the held side of said first light source by said first holding member with respect to the central axis direction of said first holding member,
said second supporting portion includes a pair of third supporting portion configured to support said second holding member in a held side of said second light source by said second holding member with respect to a central axis direction of said second holding member, and a pair of fourth supporting portion configured to support said second holding member in a side opposite to the held side of said second light source by said second holding member with respect to the central axis direction of said second holding member.

13. A scanning optical apparatus according to claim 12, wherein said first holding member and said pair of first supporting portion are adhesively fixed, and
wherein said second holding member and said pair of third supporting portion are adhesively fixed.

14. A scanning optical apparatus according to claim 12, wherein as seen in the rotational axis direction, said pair of first supporting portion, said pair of second supporting portion, said pair of third supporting portion and said pair of fourth supporting portion are provided in an order of said pair of first supporting portion, said pair of third supporting portion, said pair of second supporting portion and said pair of fourth supporting portion from the held side of said first light source by said first holding member with respect to the central axis direction of said first holding member.

15. A scanning optical apparatus according to claim 12, wherein said pair of second supporting portion is higher than said pair of first supporting portion, and said pair of fourth supporting portion is lower than said pair of third supporting portion with respect to the rotational axis direction of said rotary polygon mirror.

16. A scanning optical apparatus according to claim 10, further comprising
- a first leaf spring for urging, in the held side of said first light source by said first holding member, toward said first supporting portion, and
- a second leaf spring for urging, in the side opposite to the held side of said second light source by said second holding member, toward said second supporting portion.

17. An image forming apparatus comprising
- a scanning optical apparatus according to claim 10;
- a plurality of photosensitive members on which electrostatic latent images are formed by a plurality of laser beams emitted from said scanning optical apparatus, respectively; and
- a plurality of developing units, corresponding to said photosensitive member, respectively, configured to develop the electrostatic latent images formed on said plurality of photosensitive members and to form toner images.

* * * * *